United States Patent
Atmeh et al.

(10) Patent No.: US 12,514,564 B2
(45) Date of Patent: Jan. 6, 2026

(54) SYSTEMS AND METHODS FOR IMPROVING ULTRASOUND IMAGE QUALITY

(71) Applicant: MAUI IMAGING, INC., Tucson, AZ (US)

(72) Inventors: Elias M. Atmeh, San Jose, CA (US); Bruce R. Ritzi, Sunnyvale, CA (US); David J. Specht, Tucson, AZ (US)

(73) Assignee: Maui Imaging, Inc., Tucson, AZ (US)

( * ) Notice: Subject to any disclaimer, the term of this patent is extended or adjusted under 35 U.S.C. 154(b) by 0 days.

(21) Appl. No.: 18/251,421

(22) PCT Filed: Nov. 2, 2021

(86) PCT No.: PCT/US2021/057725
§ 371 (c)(1),
(2) Date: May 2, 2023

(87) PCT Pub. No.: WO2022/094465
PCT Pub. Date: May 5, 2022

(65) Prior Publication Data
US 2024/0000435 A1   Jan. 4, 2024

Related U.S. Application Data

(60) Provisional application No. 63/108,809, filed on Nov. 2, 2020.

(51) Int. Cl.
*A61B 8/08* (2006.01)
*A61B 8/00* (2006.01)
(Continued)

(52) U.S. Cl.
CPC .......... *A61B 8/5269* (2013.01); *A61B 8/4477* (2013.01); *A61B 8/5207* (2013.01); *G06T 5/70* (2024.01); *G06T 2207/10136* (2013.01)

(58) Field of Classification Search
CPC ... A61B 8/5269; A61B 8/4477; A61B 8/5207; A61B 8/469; G06T 5/70;
(Continued)

(56) References Cited

U.S. PATENT DOCUMENTS

| | | |
|---|---|---|
| 3,174,286 A | 3/1965 | Erickson |
| 3,895,381 A | 7/1975 | Kock |

(Continued)

FOREIGN PATENT DOCUMENTS

| | | |
|---|---|---|
| CN | 1535243 A | 10/2004 |
| CN | 1636150 A | 7/2005 |

(Continued)

OTHER PUBLICATIONS

Lockwood et al.; Real-time 3-D ultrasound imaging using sparse synthetic aperture beamforming; IEEE transactions on ultrasonics, ferroelectrics, and frequency control; 45(4); pp. 980-988; Jul. 1998.
(Continued)

*Primary Examiner* — Kaitlyn E Sebastian
(74) *Attorney, Agent, or Firm* — Shay Glenn LLP

(57) ABSTRACT

Systems and methods are provided for improving ultrasound image quality. In some embodiments, data sets can be formed from received echoes at each of a plurality of receive elements. The data between the data sets can be masked to include or exclude data. The masked data sets can then be beamformed to form ultrasound images.

12 Claims, 4 Drawing Sheets

(51) Int. Cl.
*G06T 5/00* (2024.01)
*G06T 5/70* (2024.01)

(58) Field of Classification Search
CPC .......... G06T 2207/10136; G01H 11/06; G01S 7/52026; G01S 7/52047; G01S 15/8927; G01S 15/8929
See application file for complete search history.

(56) References Cited

U.S. PATENT DOCUMENTS

| | | |
|---|---|---|
| 3,974,692 A | 8/1976 | Hassler |
| 4,055,988 A | 11/1977 | Dutton |
| 4,072,922 A | 2/1978 | Taner et al. |
| 4,097,835 A | 6/1978 | Green |
| 4,105,018 A | 8/1978 | Greenleaf et al. |
| 4,180,792 A | 12/1979 | Lederman et al. |
| 4,205,394 A | 5/1980 | Pickens |
| 4,229,798 A | 10/1980 | Rosie |
| 4,259,733 A | 3/1981 | Taner et al. |
| 4,265,126 A | 5/1981 | Papadofrangakis et al. |
| 4,271,842 A | 6/1981 | Specht et al. |
| 4,325,257 A | 4/1982 | Kino et al. |
| 4,327,738 A | 5/1982 | Green et al. |
| 4,328,569 A | 5/1982 | Trott et al. |
| 4,333,474 A | 6/1982 | Nigam |
| 4,339,952 A | 7/1982 | Foster |
| 4,452,084 A | 6/1984 | Taenzer |
| 4,501,279 A | 2/1985 | Seo |
| 4,511,998 A | 4/1985 | Kanda et al. |
| 4,539,847 A | 9/1985 | Paap |
| 4,566,459 A | 1/1986 | Umemura et al. |
| 4,567,768 A | 2/1986 | Satoh et al. |
| 4,604,697 A | 8/1986 | Luthra et al. |
| 4,662,222 A | 5/1987 | Johnson |
| 4,669,482 A | 6/1987 | Ophir |
| 4,682,497 A | 7/1987 | Sasaki |
| 4,694,434 A | 9/1987 | Vonn Ramm et al. |
| 4,781,199 A | 11/1988 | Hirama et al. |
| 4,817,434 A | 4/1989 | Anderson |
| 4,831,601 A | 5/1989 | Breimesser et al. |
| 4,893,284 A | 1/1990 | Magrane |
| 4,893,628 A | 1/1990 | Angelsen |
| 4,990,462 A | 2/1991 | Sliwa, Jr. |
| 5,027,658 A | 7/1991 | Anderson |
| 5,050,588 A | 9/1991 | Grey et al. |
| 5,060,205 A | 10/1991 | Phelan |
| 5,062,295 A | 11/1991 | Shakkottai et al. |
| 5,141,738 A | 8/1992 | Rasor et al. |
| 5,161,536 A | 11/1992 | Vilkomerson et al. |
| 5,197,475 A | 3/1993 | Antich et al. |
| 5,226,019 A | 7/1993 | Bahorich |
| 5,230,339 A | 7/1993 | Charlebois |
| 5,269,309 A | 12/1993 | Fort et al. |
| 5,278,757 A | 1/1994 | Hoctor et al. |
| 5,293,871 A | 3/1994 | Reinstein et al. |
| 5,299,576 A | 4/1994 | Shiba |
| 5,301,674 A | 4/1994 | Erikson et al. |
| 5,305,756 A | 4/1994 | Entrekin et al. |
| 5,339,282 A | 8/1994 | Kuhn et al. |
| 5,340,510 A | 8/1994 | Bowen |
| 5,345,426 A | 9/1994 | Lipschutz |
| 5,349,960 A | 9/1994 | Gondo |
| 5,355,888 A | 10/1994 | Kendall |
| 5,381,794 A | 1/1995 | Tei et al. |
| 5,398,216 A | 3/1995 | Hall et al. |
| 5,409,010 A | 4/1995 | Beach et al. |
| 5,442,462 A | 8/1995 | Guissin |
| 5,454,372 A | 10/1995 | Banjanin et al. |
| 5,477,858 A | 12/1995 | Norris et al. |
| 5,503,152 A | 4/1996 | Oakley et al. |
| 5,515,853 A | 5/1996 | Smith et al. |
| 5,515,856 A | 5/1996 | Olstad et al. |
| 5,522,393 A | 6/1996 | Phillips et al. |
| 5,526,815 A | 6/1996 | Granz et al. |
| 5,544,659 A | 8/1996 | Banjanin |
| 5,558,092 A | 9/1996 | Unger |
| 5,564,423 A | 10/1996 | Mele et al. |
| 5,568,812 A | 10/1996 | Murashita et al. |
| 5,570,691 A | 11/1996 | Wright et al. |
| 5,581,517 A | 12/1996 | Gee et al. |
| 5,625,149 A | 4/1997 | Gururaja et al. |
| 5,628,320 A | 5/1997 | Teo |
| 5,666,953 A | 9/1997 | Wilk |
| 5,673,697 A | 10/1997 | Bryan et al. |
| 5,675,550 A | 10/1997 | Ekhaus |
| 5,720,291 A | 2/1998 | Schwartz |
| 5,720,708 A | 2/1998 | Lu et al. |
| 5,744,898 A | 4/1998 | Smith et al. |
| 5,769,079 A | 6/1998 | Hossack |
| 5,784,334 A | 7/1998 | Sena et al. |
| 5,785,654 A | 7/1998 | Iinuma et al. |
| 5,795,297 A | 8/1998 | Daigle |
| 5,797,845 A | 8/1998 | Barabash et al. |
| 5,798,459 A | 8/1998 | Ohba et al. |
| 5,817,023 A | 10/1998 | Daft |
| 5,820,561 A | 10/1998 | Olstad et al. |
| 5,838,564 A | 11/1998 | Bahorich et al. |
| 5,850,622 A | 12/1998 | Vassiliou et al. |
| 5,862,100 A | 1/1999 | VerWest |
| 5,870,691 A | 2/1999 | Partyka et al. |
| 5,871,446 A | 2/1999 | Wilk |
| 5,876,342 A | 3/1999 | Chen et al. |
| 5,891,038 A | 4/1999 | Seyed-Bolorforosh et al. |
| 5,892,732 A | 4/1999 | Gersztenkorn |
| 5,916,169 A | 6/1999 | Hanafy et al. |
| 5,919,139 A | 7/1999 | Lin |
| 5,920,285 A | 7/1999 | Benjamin |
| 5,930,730 A | 7/1999 | Marfurt et al. |
| 5,938,612 A | 8/1999 | Kline-Schoder et al. |
| 5,940,778 A | 8/1999 | Marfurt et al. |
| 5,951,479 A | 9/1999 | Holm et al. |
| 5,964,707 A | 10/1999 | Fenster et al. |
| 5,969,661 A | 10/1999 | Benjamin |
| 5,999,836 A | 12/1999 | Nelson et al. |
| 6,007,499 A | 12/1999 | Martin et al. |
| 6,013,032 A | 1/2000 | Savord |
| 6,014,473 A | 1/2000 | Hossack et al. |
| 6,048,315 A | 4/2000 | Chiao et al. |
| 6,049,509 A | 4/2000 | Sonneland et al. |
| 6,050,943 A | 4/2000 | Slayton et al. |
| 6,056,693 A | 5/2000 | Haider |
| 6,058,074 A | 5/2000 | Swan et al. |
| 6,077,224 A | 6/2000 | Lang et al. |
| 6,092,026 A | 7/2000 | Bahorich et al. |
| 6,122,538 A | 9/2000 | Sliwa, Jr. et al. |
| 6,123,670 A | 9/2000 | Mo |
| 6,129,672 A | 10/2000 | Seward et al. |
| 6,135,960 A | 10/2000 | Holmberg |
| 6,138,075 A | 10/2000 | Yost |
| 6,148,095 A | 11/2000 | Prause et al. |
| 6,162,175 A | 12/2000 | Marian, Jr. et al. |
| 6,166,384 A | 12/2000 | Dentinger et al. |
| 6,166,853 A | 12/2000 | Sapia et al. |
| 6,190,318 B1 | 2/2001 | Bab et al. |
| 6,193,665 B1 | 2/2001 | Hall et al. |
| 6,196,739 B1 | 3/2001 | Silverbrook |
| 6,200,266 B1 | 3/2001 | Shokrollahi et al. |
| 6,210,335 B1 | 4/2001 | Miller |
| 6,213,958 B1 | 4/2001 | Winder |
| 6,221,019 B1 | 4/2001 | Kantorovich |
| 6,224,556 B1 | 5/2001 | Schwartz et al. |
| 6,231,511 B1 | 5/2001 | Bae |
| 6,238,342 B1 | 5/2001 | Feleppa et al. |
| 6,246,901 B1 | 6/2001 | Benaron |
| 6,251,073 B1 | 6/2001 | Imran et al. |
| 6,264,609 B1 | 7/2001 | Herrington et al. |
| 6,266,551 B1 | 7/2001 | Osadchy et al. |
| 6,278,949 B1 | 8/2001 | Alam |
| 6,279,399 B1 | 8/2001 | Holm |
| 6,289,230 B1 | 9/2001 | Chaiken et al. |
| 6,299,580 B1 | 10/2001 | Asafusa |
| 6,304,684 B1 | 10/2001 | Niczyporuk et al. |
| 6,309,356 B1 | 10/2001 | Ustuner et al. |

(56) References Cited

U.S. PATENT DOCUMENTS

| | | |
|---|---|---|
| 6,324,453 B1 | 11/2001 | Breed et al. |
| 6,345,539 B1 | 2/2002 | Rawes et al. |
| 6,361,500 B1 | 3/2002 | Masters |
| 6,363,033 B1 | 3/2002 | Cole et al. |
| 6,370,480 B1 | 4/2002 | Gupta et al. |
| 6,373,984 B1 | 4/2002 | Gouge et al. |
| 6,374,185 B1 | 4/2002 | Taner et al. |
| 6,394,955 B1 | 5/2002 | Perlitz |
| 6,423,002 B1 | 7/2002 | Hossack |
| 6,431,175 B1 | 8/2002 | Penner et al. |
| 6,436,046 B1 | 8/2002 | Napolitano et al. |
| 6,449,821 B1 | 9/2002 | Sudol et al. |
| 6,450,965 B2 | 9/2002 | Williams et al. |
| 6,464,637 B1 | 10/2002 | Criton et al. |
| 6,468,216 B1 | 10/2002 | Powers et al. |
| 6,471,650 B2 | 10/2002 | Powers et al. |
| 6,475,150 B2 | 11/2002 | Haddad |
| 6,480,790 B1 | 11/2002 | Calvert et al. |
| 6,487,502 B1 | 11/2002 | Taner |
| 6,490,477 B1 | 12/2002 | Zylka et al. |
| 6,499,536 B1 | 12/2002 | Ellingsen |
| 6,503,204 B1 | 1/2003 | Sumanaweera et al. |
| 6,508,768 B1 | 1/2003 | Hall et al. |
| 6,508,770 B1 | 1/2003 | Cai |
| 6,514,205 B1 | 2/2003 | Lee et al. |
| 6,517,484 B1 | 2/2003 | Wilk et al. |
| 6,526,163 B1 | 2/2003 | Halmann et al. |
| 6,543,272 B1 | 4/2003 | Vitek |
| 6,547,732 B2 | 4/2003 | Jago |
| 6,551,246 B1 | 4/2003 | Ustuner et al. |
| 6,565,510 B1 | 5/2003 | Haider |
| 6,582,367 B1 | 6/2003 | Robinson et al. |
| 6,585,647 B1 | 7/2003 | Winder |
| 6,597,171 B2 | 7/2003 | Hurlimann et al. |
| 6,604,421 B1 | 8/2003 | Li |
| 6,614,560 B1 | 9/2003 | Silverbrook |
| 6,620,101 B2 | 9/2003 | Azzam et al. |
| 6,629,929 B1 | 10/2003 | Jago et al. |
| 6,645,147 B1 | 11/2003 | Jackosn et al. |
| 6,652,461 B1 | 11/2003 | Levkovitz |
| 6,668,654 B2 | 12/2003 | Dubois et al. |
| 6,672,165 B2 | 1/2004 | Rather et al. |
| 6,681,185 B1 | 1/2004 | Young et al. |
| 6,690,816 B2 | 2/2004 | Aylward et al. |
| 6,692,450 B1 | 2/2004 | Coleman |
| 6,695,778 B2 | 2/2004 | Golland et al. |
| 6,702,745 B1 | 3/2004 | Smythe |
| 6,704,692 B1 | 3/2004 | Banerjee et al. |
| 6,719,693 B2 | 4/2004 | Richard |
| 6,728,567 B2 | 4/2004 | Rather et al. |
| 6,752,762 B1 | 6/2004 | DeJong et al. |
| 6,755,787 B2 | 6/2004 | Hossack et al. |
| 6,780,152 B2 | 8/2004 | Ustuner et al. |
| 6,790,182 B2 | 9/2004 | Eck et al. |
| 6,835,178 B1 | 12/2004 | Wilson et al. |
| 6,837,853 B2 | 1/2005 | Marian |
| 6,843,770 B2 | 1/2005 | Sumanaweera |
| 6,847,737 B1 | 1/2005 | Kouri et al. |
| 6,854,332 B2 | 2/2005 | Alleyne |
| 6,865,140 B2 | 3/2005 | Thomenius et al. |
| 6,932,767 B2 | 8/2005 | Landry et al. |
| 7,033,320 B2 | 4/2006 | Von Behren et al. |
| 7,087,023 B2 | 8/2006 | Daft et al. |
| 7,104,956 B1 | 9/2006 | Christopher |
| 7,217,243 B2 | 5/2007 | Takeuchi |
| 7,221,867 B2 | 5/2007 | Silverbrook |
| 7,231,072 B2 | 6/2007 | Yamano et al. |
| 7,269,299 B2 | 9/2007 | Schroeder |
| 7,283,652 B2 | 10/2007 | Mendonca et al. |
| 7,285,094 B2 | 10/2007 | Nohara et al. |
| 7,293,462 B2 | 11/2007 | Lee et al. |
| 7,313,053 B2 | 12/2007 | Wodnicki |
| 7,366,704 B2 | 4/2008 | Reading et al. |
| 7,402,136 B2 | 7/2008 | Hossack et al. |
| 7,410,469 B1 | 8/2008 | Talish et al. |
| 7,415,880 B2 | 8/2008 | Renzel |
| 7,443,765 B2 | 10/2008 | Thomenius et al. |
| 7,444,875 B1 | 11/2008 | Wu et al. |
| 7,447,535 B2 | 11/2008 | Lavi |
| 7,448,998 B2 | 11/2008 | Robinson |
| 7,466,848 B2 | 12/2008 | Metaxas et al. |
| 7,469,096 B2 | 12/2008 | Silverbrook |
| 7,474,778 B2 | 1/2009 | Shinomura et al. |
| 7,481,577 B2 | 1/2009 | Ramamurthy et al. |
| 7,491,171 B2 | 2/2009 | Barthe et al. |
| 7,497,828 B1 | 3/2009 | Wilk et al. |
| 7,497,830 B2 | 3/2009 | Li |
| 7,510,529 B2 | 3/2009 | Chou et al. |
| 7,514,851 B2 | 4/2009 | Wilser et al. |
| 7,549,962 B2 | 6/2009 | Dreschel et al. |
| 7,574,026 B2 | 8/2009 | Rasche et al. |
| 7,625,343 B2 | 12/2009 | Cao et al. |
| 7,637,869 B2 | 12/2009 | Sudol |
| 7,668,583 B2 | 2/2010 | Fegert et al. |
| 7,674,228 B2 | 3/2010 | Williams et al. |
| 7,682,311 B2 | 3/2010 | Simopoulos et al. |
| 7,699,776 B2 | 4/2010 | Walker et al. |
| 7,722,541 B2 | 5/2010 | Cai |
| 7,744,532 B2 | 6/2010 | Ustuner et al. |
| 7,750,311 B2 | 7/2010 | Daghighian |
| 7,764,984 B2 | 7/2010 | Desmedt et al. |
| 7,785,260 B2 | 8/2010 | Umemura et al. |
| 7,787,680 B2 | 8/2010 | Ahn et al. |
| 7,806,828 B2 | 10/2010 | Stringer |
| 7,819,810 B2 | 10/2010 | Stringer et al. |
| 7,822,250 B2 | 10/2010 | Yao et al. |
| 7,824,337 B2 | 11/2010 | Abe et al. |
| 7,833,163 B2 | 11/2010 | Cai |
| 7,837,624 B1 | 11/2010 | Hossack et al. |
| 7,846,097 B2 | 12/2010 | Jones et al. |
| 7,850,613 B2 | 12/2010 | Stribling |
| 7,862,508 B2 | 1/2011 | Davies et al. |
| 7,876,945 B2 | 1/2011 | Lötjönen |
| 7,880,154 B2 | 2/2011 | Otto |
| 7,887,486 B2 | 2/2011 | Ustuner et al. |
| 7,901,358 B2 | 3/2011 | Mehi et al. |
| 7,914,451 B2 | 3/2011 | Davies |
| 7,919,906 B2 | 4/2011 | Cerofolini |
| 7,926,350 B2 | 4/2011 | Kröning et al. |
| 7,927,280 B2 | 4/2011 | Davidsen |
| 7,972,271 B2 | 7/2011 | Johnson et al. |
| 7,984,637 B2 | 7/2011 | Ao et al. |
| 7,984,651 B2 | 7/2011 | Randall et al. |
| 8,002,705 B1 | 8/2011 | Napolitano et al. |
| 8,007,439 B2 | 8/2011 | Specht |
| 8,057,392 B2 | 11/2011 | Hossack et al. |
| 8,057,393 B2 | 11/2011 | Yao et al. |
| 8,079,263 B2 | 12/2011 | Randall et al. |
| 8,079,956 B2 | 12/2011 | Azuma et al. |
| 8,088,067 B2 | 1/2012 | Vortman et al. |
| 8,088,068 B2 | 1/2012 | Yao et al. |
| 8,088,071 B2 | 1/2012 | Hwang et al. |
| 8,105,239 B2 | 1/2012 | Specht |
| 8,135,190 B2 | 3/2012 | Bae et al. |
| 8,157,737 B2 | 4/2012 | Zhang et al. |
| 8,182,427 B2 | 5/2012 | Wu et al. |
| 8,202,219 B2 | 6/2012 | Luo et al. |
| 8,265,175 B2 | 9/2012 | Barsoum et al. |
| 8,277,383 B2 | 10/2012 | Specht |
| 8,279,705 B2 | 10/2012 | Choi et al. |
| 8,343,054 B1 | 1/2013 | Tamura |
| 8,412,307 B2 | 4/2013 | Willis et al. |
| 8,414,564 B2 | 4/2013 | Goldshleger et al. |
| 8,419,642 B2 | 4/2013 | Sandrin et al. |
| 8,473,239 B2 | 6/2013 | Specht et al. |
| 8,478,382 B2 | 7/2013 | Burnside et al. |
| 8,483,804 B2 | 7/2013 | Hsieh et al. |
| 8,532,951 B2 | 9/2013 | Roy et al. |
| 8,539,838 B2 | 9/2013 | Yoo et al. |
| 8,582,848 B2 | 11/2013 | Funka-Lea et al. |
| 8,602,993 B2 | 12/2013 | Specht et al. |
| 8,627,724 B2 | 1/2014 | Papadopoulos et al. |
| 8,634,615 B2 | 1/2014 | Brabec |
| 8,672,846 B2 | 3/2014 | Napolitano et al. |

(56) References Cited

U.S. PATENT DOCUMENTS

| | | |
|---|---|---|
| 8,684,936 B2 | 4/2014 | Specht |
| 9,036,887 B2 | 5/2015 | Fouras et al. |
| 9,072,495 B2 | 7/2015 | Specht |
| 9,146,313 B2 | 9/2015 | Specht et al. |
| 9,152,761 B2 | 10/2015 | Bhatia et al. |
| 9,176,078 B2 | 11/2015 | Flohr et al. |
| 9,192,355 B2 | 11/2015 | Specht et al. |
| 9,217,660 B2 | 12/2015 | Zlotnick et al. |
| 9,220,478 B2 | 12/2015 | Smith et al. |
| 9,247,874 B2 | 2/2016 | Kumar et al. |
| 9,247,926 B2 | 2/2016 | Smith et al. |
| 9,265,484 B2 | 2/2016 | Brewer et al. |
| 9,268,777 B2 | 2/2016 | Lu et al. |
| 9,271,661 B2 | 3/2016 | Moghari et al. |
| 9,277,861 B2 | 3/2016 | Kowal et al. |
| 9,282,945 B2 | 3/2016 | Smith et al. |
| 9,339,239 B2 | 5/2016 | Wang et al. |
| 9,339,256 B2 | 5/2016 | Specht et al. |
| 9,392,986 B2 | 7/2016 | Ning et al. |
| 9,420,994 B2 | 8/2016 | Specht |
| 9,510,806 B2 | 12/2016 | Smith et al. |
| 9,526,475 B2 | 12/2016 | Specht et al. |
| 9,526,485 B2 | 12/2016 | Yang |
| 9,572,549 B2 | 2/2017 | Belevich et al. |
| 9,576,354 B2 | 2/2017 | Fouras et al. |
| 9,582,876 B2 | 2/2017 | Specht |
| 9,606,206 B2 | 3/2017 | Boernert et al. |
| 9,659,152 B2 | 5/2017 | Mueller |
| 9,668,714 B2 | 6/2017 | Call et al. |
| 9,706,972 B1 | 7/2017 | Ahn et al. |
| 9,775,511 B2 | 10/2017 | Kumar et al. |
| 9,788,813 B2 | 10/2017 | Adam et al. |
| 9,883,848 B2 | 2/2018 | Specht et al. |
| 9,901,407 B2 | 2/2018 | Breisacher et al. |
| 9,986,969 B2 | 6/2018 | Call et al. |
| 9,986,975 B2 | 6/2018 | Specht et al. |
| 10,064,605 B2 | 9/2018 | Belevich et al. |
| 10,130,333 B2 | 11/2018 | Specht |
| 10,206,662 B2 | 2/2019 | Smith et al. |
| 10,226,234 B2 | 3/2019 | Specht et al. |
| 10,267,913 B2 | 4/2019 | Smith et al. |
| 10,342,518 B2 | 7/2019 | Specht et al. |
| 10,380,399 B2 | 8/2019 | Call et al. |
| 10,401,493 B2 | 9/2019 | Call et al. |
| 10,586,846 B2 | 3/2020 | Bolotnikov et al. |
| 10,617,384 B2 | 4/2020 | Brewer et al. |
| 10,653,392 B2 | 5/2020 | Specht et al. |
| 10,675,000 B2 | 6/2020 | Specht et al. |
| 10,695,027 B2 | 6/2020 | Call et al. |
| 10,835,208 B2 | 11/2020 | Smith et al. |
| 10,854,846 B2 | 12/2020 | Kim et al. |
| 10,856,846 B2 | 12/2020 | Davies et al. |
| 10,925,577 B2 | 2/2021 | Adam et al. |
| 11,016,191 B2 | 5/2021 | Call et al. |
| 11,051,791 B2 | 7/2021 | Smith et al. |
| 11,068,689 B2 | 7/2021 | Call et al. |
| 11,096,662 B2 | 8/2021 | Specht |
| 11,172,911 B2 | 11/2021 | Call et al. |
| 11,253,233 B2 | 2/2022 | Belevich et al. |
| 11,464,492 B2 | 10/2022 | Specht et al. |
| 11,678,861 B2 | 6/2023 | Call et al. |
| 11,709,265 B2 | 7/2023 | Call et al. |
| 11,723,626 B2 | 8/2023 | Smith et al. |
| 2002/0035864 A1 | 3/2002 | Paltieli et al. |
| 2002/0073781 A1 | 6/2002 | Hashimoto et al. |
| 2002/0087071 A1 | 7/2002 | Schmitz et al. |
| 2002/0111568 A1 | 8/2002 | Bukshpan |
| 2002/0138003 A1 | 9/2002 | Bukshpan |
| 2002/0161299 A1 | 10/2002 | Prater et al. |
| 2003/0007598 A1 | 1/2003 | Wang et al. |
| 2003/0013962 A1 | 1/2003 | Bjaerum et al. |
| 2003/0028111 A1 | 2/2003 | Vaezy et al. |
| 2003/0040669 A1 | 2/2003 | Grass et al. |
| 2003/0163271 A1 | 8/2003 | Chell et al. |
| 2003/0181806 A1 | 9/2003 | Medan et al. |
| 2003/0220554 A1 | 11/2003 | Grenon et al. |
| 2003/0228053 A1 | 12/2003 | Li et al. |
| 2004/0015079 A1 | 1/2004 | Berger et al. |
| 2004/0054283 A1 | 3/2004 | Corey et al. |
| 2004/0068184 A1 | 4/2004 | Trahey et al. |
| 2004/0100163 A1 | 5/2004 | Baumgartner et al. |
| 2004/0111028 A1 | 6/2004 | Abe et al. |
| 2004/0122313 A1 | 6/2004 | Moore et al. |
| 2004/0122322 A1 | 6/2004 | Moore et al. |
| 2004/0127793 A1 | 7/2004 | Mendlein et al. |
| 2004/0138565 A1 | 7/2004 | Trucco |
| 2004/0144176 A1 | 7/2004 | Yoden |
| 2004/0215075 A1 | 10/2004 | Zagzebski et al. |
| 2004/0236217 A1 | 11/2004 | Cerwin et al. |
| 2004/0236223 A1 | 11/2004 | Barnes et al. |
| 2004/0258127 A1 | 12/2004 | Ramamurthy et al. |
| 2004/0267132 A1 | 12/2004 | Podany |
| 2005/0004449 A1 | 1/2005 | Mitschke et al. |
| 2005/0053305 A1 | 3/2005 | Li et al. |
| 2005/0054910 A1 | 3/2005 | Tremblay et al. |
| 2005/0061536 A1 | 3/2005 | Proulx |
| 2005/0090743 A1 | 4/2005 | Kawashima et al. |
| 2005/0090745 A1 | 4/2005 | Steen |
| 2005/0111846 A1 | 5/2005 | Steinbacher et al. |
| 2005/0113689 A1 | 5/2005 | Gritzky |
| 2005/0113694 A1 | 5/2005 | Haugen et al. |
| 2005/0124883 A1 | 6/2005 | Hunt |
| 2005/0131300 A1 | 6/2005 | Bakircioglu et al. |
| 2005/0147297 A1 | 7/2005 | McLaughlin et al. |
| 2005/0148874 A1 | 7/2005 | Brock-Fisher et al. |
| 2005/0165312 A1 | 7/2005 | Knowles et al. |
| 2005/0203404 A1 | 9/2005 | Freiburger |
| 2005/0215883 A1 | 9/2005 | Hundley et al. |
| 2005/0240125 A1 | 10/2005 | Makin et al. |
| 2005/0251013 A1 | 11/2005 | Krishan et al. |
| 2005/0252295 A1 | 11/2005 | Fink et al. |
| 2005/0281447 A1 | 12/2005 | Moreau-Gobard et al. |
| 2005/0288588 A1 | 12/2005 | Weber et al. |
| 2006/0036170 A1 | 2/2006 | Lachaine et al. |
| 2006/0058664 A1 | 3/2006 | Barthe et al. |
| 2006/0062447 A1 | 3/2006 | Rinck et al. |
| 2006/0074313 A1 | 4/2006 | Slayton et al. |
| 2006/0074315 A1 | 4/2006 | Liang et al. |
| 2006/0074320 A1 | 4/2006 | Yoo et al. |
| 2006/0079759 A1 | 4/2006 | Vaillant et al. |
| 2006/0079778 A1 | 4/2006 | Mo et al. |
| 2006/0079782 A1 | 4/2006 | Beach et al. |
| 2006/0094962 A1 | 5/2006 | Clark |
| 2006/0111634 A1 | 5/2006 | Wu |
| 2006/0122506 A1 | 6/2006 | Davies et al. |
| 2006/0173327 A1 | 8/2006 | Kim |
| 2006/0256231 A1 | 11/2006 | Sasaki et al. |
| 2006/0262961 A1 | 11/2006 | Holsing et al. |
| 2006/0270934 A1 | 11/2006 | Savord et al. |
| 2007/0016022 A1 | 1/2007 | Blalock et al. |
| 2007/0016044 A1 | 1/2007 | Blalock et al. |
| 2007/0036414 A1 | 2/2007 | Georgescu et al. |
| 2007/0043290 A1 | 2/2007 | Goepp |
| 2007/0055155 A1 | 3/2007 | Owen et al. |
| 2007/0073781 A1 | 3/2007 | Adkins et al. |
| 2007/0078345 A1 | 4/2007 | Mo et al. |
| 2007/0083109 A1 | 4/2007 | Ustuner et al. |
| 2007/0088213 A1 | 4/2007 | Poland |
| 2007/0138157 A1 | 6/2007 | Dane et al. |
| 2007/0161898 A1 | 7/2007 | Hao et al. |
| 2007/0161904 A1 | 7/2007 | Urbano |
| 2007/0167752 A1 | 7/2007 | Proulx et al. |
| 2007/0167824 A1 | 7/2007 | Lee et al. |
| 2007/0232914 A1 | 10/2007 | Chen et al. |
| 2007/0238985 A1 | 10/2007 | Smith et al. |
| 2007/0242567 A1 | 10/2007 | Daft et al. |
| 2008/0009739 A1 | 1/2008 | Chiang et al. |
| 2008/0044072 A1 | 2/2008 | Loeffler et al. |
| 2008/0103393 A1* | 5/2008 | Specht ............... A61B 8/4209 600/437 |
| 2008/0110261 A1 | 5/2008 | Randall et al. |
| 2008/0110263 A1 | 5/2008 | Klessel et al. |
| 2008/0112265 A1 | 5/2008 | Urbano et al. |
| 2008/0114241 A1 | 5/2008 | Randall et al. |

(56) References Cited

U.S. PATENT DOCUMENTS

| | | |
|---|---|---|
| 2008/0114245 A1 | 5/2008 | Randall et al. |
| 2008/0114246 A1 | 5/2008 | Randall et al. |
| 2008/0114247 A1 | 5/2008 | Urbano et al. |
| 2008/0114248 A1 | 5/2008 | Urbano et al. |
| 2008/0114249 A1 | 5/2008 | Randall et al. |
| 2008/0114250 A1 | 5/2008 | Urbano et al. |
| 2008/0114251 A1 | 5/2008 | Weymer et al. |
| 2008/0114252 A1 | 5/2008 | Randall et al. |
| 2008/0114253 A1 | 5/2008 | Randall et al. |
| 2008/0114255 A1 | 5/2008 | Schwartz et al. |
| 2008/0125659 A1 | 5/2008 | Wilser et al. |
| 2008/0132790 A1 | 6/2008 | Burton |
| 2008/0181479 A1 | 7/2008 | Yang et al. |
| 2008/0183075 A1 | 7/2008 | Govari et al. |
| 2008/0188747 A1 | 8/2008 | Randall et al. |
| 2008/0188750 A1 | 8/2008 | Randall et al. |
| 2008/0194957 A1 | 8/2008 | Hoctor et al. |
| 2008/0194958 A1 | 8/2008 | Lee et al. |
| 2008/0194959 A1 | 8/2008 | Wang et al. |
| 2008/0208061 A1 | 8/2008 | Halmann |
| 2008/0242996 A1 | 10/2008 | Hall et al. |
| 2008/0249408 A1 | 10/2008 | Palmeri et al. |
| 2008/0255452 A1 | 10/2008 | Entrekin |
| 2008/0262357 A1 | 10/2008 | Wodnicki |
| 2008/0269604 A1 | 10/2008 | Boctor et al. |
| 2008/0269613 A1 | 10/2008 | Summers et al. |
| 2008/0275344 A1 | 11/2008 | Glide-Hurst et al. |
| 2008/0285819 A1 | 11/2008 | Konofagou et al. |
| 2008/0287787 A1 | 11/2008 | Sauer et al. |
| 2008/0294045 A1 | 11/2008 | Ellington et al. |
| 2008/0294050 A1 | 11/2008 | Shinomura et al. |
| 2008/0294052 A1 | 11/2008 | Wilser et al. |
| 2008/0306382 A1 | 12/2008 | Guracar et al. |
| 2008/0306386 A1 | 12/2008 | Baba et al. |
| 2008/0319317 A1 | 12/2008 | Kamiyama et al. |
| 2008/0319318 A1 | 12/2008 | Johnson et al. |
| 2009/0005679 A1 | 1/2009 | Dala-Krishna |
| 2009/0010459 A1 | 1/2009 | Garbini et al. |
| 2009/0012393 A1 | 1/2009 | Choi |
| 2009/0015665 A1 | 1/2009 | Willsie |
| 2009/0016163 A1 | 1/2009 | Freeman et al. |
| 2009/0018445 A1 | 1/2009 | Schers et al. |
| 2009/0024039 A1 | 1/2009 | Wang et al. |
| 2009/0036780 A1 | 2/2009 | Abraham |
| 2009/0043206 A1 | 2/2009 | Towfiq et al. |
| 2009/0048519 A1 | 2/2009 | Hossack et al. |
| 2009/0069681 A1 | 3/2009 | Lundberg et al. |
| 2009/0069686 A1 | 3/2009 | Daft et al. |
| 2009/0069692 A1 | 3/2009 | Cooley et al. |
| 2009/0079299 A1 | 3/2009 | Bradley et al. |
| 2009/0099483 A1 | 4/2009 | Rybyanets |
| 2009/0112095 A1 | 4/2009 | Daigle |
| 2009/0131797 A1 | 5/2009 | Jeong et al. |
| 2009/0143680 A1 | 6/2009 | Yao et al. |
| 2009/0148012 A1 | 6/2009 | Altmann et al. |
| 2009/0150094 A1 | 6/2009 | Van Velsor et al. |
| 2009/0182233 A1 | 7/2009 | Wodnicki |
| 2009/0182237 A1 | 7/2009 | Angelsen et al. |
| 2009/0198134 A1 | 8/2009 | Hashimoto et al. |
| 2009/0203997 A1 | 8/2009 | Ustuner |
| 2009/0208080 A1 | 8/2009 | Grau et al. |
| 2009/0259128 A1 | 10/2009 | Stribling |
| 2009/0264760 A1 | 10/2009 | Lazebnik et al. |
| 2009/0306510 A1 | 12/2009 | Hashiba et al. |
| 2009/0326379 A1 | 12/2009 | Daigle et al. |
| 2010/0010354 A1 | 1/2010 | Skert et al. |
| 2010/0016725 A1 | 1/2010 | Thiele |
| 2010/0036258 A1 | 2/2010 | Dietz et al. |
| 2010/0063397 A1 | 3/2010 | Wagner |
| 2010/0063399 A1 | 3/2010 | Walker et al. |
| 2010/0069751 A1 | 3/2010 | Hazard et al. |
| 2010/0069756 A1 | 3/2010 | Ogasawara et al. |
| 2010/0085383 A1 | 4/2010 | Cohen et al. |
| 2010/0106431 A1 | 4/2010 | Baba et al. |
| 2010/0109481 A1 | 5/2010 | Buccafusca |
| 2010/0121193 A1 | 5/2010 | Fukukita et al. |
| 2010/0121196 A1 | 5/2010 | Hwang et al. |
| 2010/0130855 A1 | 5/2010 | Lundberg et al. |
| 2010/0145195 A1 | 6/2010 | Hyun |
| 2010/0168566 A1 | 7/2010 | Bercoff et al. |
| 2010/0168578 A1 | 7/2010 | Garson, Jr. et al. |
| 2010/0174194 A1 | 7/2010 | Chiang et al. |
| 2010/0174198 A1 | 7/2010 | Young et al. |
| 2010/0191110 A1 | 7/2010 | Insana et al. |
| 2010/0217124 A1 | 8/2010 | Cooley |
| 2010/0217125 A1 | 8/2010 | Kadokura et al. |
| 2010/0228126 A1 | 9/2010 | Emery et al. |
| 2010/0240994 A1 | 9/2010 | Zheng |
| 2010/0249596 A1 | 9/2010 | Magee |
| 2010/0256488 A1 | 10/2010 | Kim et al. |
| 2010/0262013 A1 | 10/2010 | Smith et al. |
| 2010/0266176 A1 | 10/2010 | Masumoto et al. |
| 2010/0286525 A1 | 11/2010 | Osumi |
| 2010/0286527 A1 | 11/2010 | Cannon et al. |
| 2010/0298712 A1 | 11/2010 | Pelissier et al. |
| 2010/0310143 A1 | 12/2010 | Rao et al. |
| 2010/0317971 A1 | 12/2010 | Fan et al. |
| 2010/0324418 A1 | 12/2010 | El-Aklouk et al. |
| 2010/0324423 A1 | 12/2010 | El-Aklouk et al. |
| 2010/0329521 A1 | 12/2010 | Beymer et al. |
| 2011/0005322 A1 | 1/2011 | Ustuner |
| 2011/0016977 A1 | 1/2011 | Guracar |
| 2011/0021920 A1 | 1/2011 | Shafir et al. |
| 2011/0021923 A1 | 1/2011 | Daft et al. |
| 2011/0033098 A1 | 2/2011 | Richter et al. |
| 2011/0044133 A1 | 2/2011 | Tokita |
| 2011/0066030 A1 | 3/2011 | Yao |
| 2011/0098565 A1 | 4/2011 | Masuzawa |
| 2011/0112400 A1 | 5/2011 | Emery et al. |
| 2011/0112404 A1 | 5/2011 | Gourevitch |
| 2011/0125017 A1 | 5/2011 | Ramamurthy et al. |
| 2011/0178441 A1 | 7/2011 | Tyler |
| 2011/0196237 A1 | 8/2011 | Pelissier et al. |
| 2011/0213244 A1* | 9/2011 | Frinking ............ A61B 8/481 |
| | | 600/431 |
| 2011/0270088 A1 | 11/2011 | Shiina |
| 2011/0301470 A1 | 12/2011 | Sato et al. |
| 2011/0306886 A1 | 12/2011 | Daft et al. |
| 2011/0319764 A1 | 12/2011 | Okada et al. |
| 2012/0004545 A1 | 1/2012 | Ziv-Ari et al. |
| 2012/0035482 A1 | 2/2012 | Kim et al. |
| 2012/0036934 A1 | 2/2012 | Kröning et al. |
| 2012/0071710 A1 | 3/2012 | Gazdzinski |
| 2012/0085173 A1 | 4/2012 | Papadopoulos et al. |
| 2012/0101378 A1 | 4/2012 | Lee |
| 2012/0114210 A1 | 5/2012 | Kim et al. |
| 2012/0121150 A1 | 5/2012 | Murashita |
| 2012/0137778 A1 | 6/2012 | Kitazawa et al. |
| 2012/0140595 A1* | 6/2012 | Amemiya ........... G01S 15/8927 |
| | | 367/87 |
| 2012/0141002 A1 | 6/2012 | Urbano et al. |
| 2012/0165670 A1 | 6/2012 | Shi et al. |
| 2012/0179044 A1 | 7/2012 | Chiang et al. |
| 2012/0209150 A1 | 8/2012 | Zeng et al. |
| 2012/0226201 A1 | 9/2012 | Clark et al. |
| 2012/0235998 A1 | 9/2012 | Smith-Casem et al. |
| 2012/0243763 A1 | 9/2012 | Wen et al. |
| 2012/0253194 A1 | 10/2012 | Tamura |
| 2012/0265075 A1 | 10/2012 | Pedrizzetti et al. |
| 2012/0277585 A1 | 11/2012 | Koenig et al. |
| 2012/0283564 A1 | 11/2012 | Ebbini et al. |
| 2013/0030296 A1 | 1/2013 | Miyaki |
| 2013/0046168 A1 | 2/2013 | Sui |
| 2013/0070062 A1 | 3/2013 | Fouras et al. |
| 2013/0076207 A1 | 3/2013 | Krohn et al. |
| 2013/0079639 A1 | 3/2013 | Hoctor et al. |
| 2013/0083628 A1 | 4/2013 | Qiao et al. |
| 2013/0088122 A1 | 4/2013 | Krohn et al. |
| 2013/0116561 A1 | 5/2013 | Rothberg et al. |
| 2013/0128702 A1 | 5/2013 | Degertekin et al. |
| 2013/0131516 A1 | 5/2013 | Katsuyama |
| 2013/0144165 A1 | 6/2013 | Ebbini et al. |
| 2013/0204136 A1 | 8/2013 | Duric et al. |
| 2013/0204137 A1 | 8/2013 | Roy et al. |

(56) References Cited

U.S. PATENT DOCUMENTS

| | | |
|---|---|---|
| 2013/0237799 A1 | 9/2013 | Motoki |
| 2013/0258805 A1 | 10/2013 | Hansen et al. |
| 2013/0261463 A1 | 10/2013 | Chiang et al. |
| 2013/0310688 A1 | 11/2013 | Rosen et al. |
| 2013/0317331 A1 | 11/2013 | Bechtel et al. |
| 2013/0338474 A9 | 12/2013 | Carson et al. |
| 2013/0345566 A1 | 12/2013 | Weitzel et al. |
| 2014/0056099 A1 | 2/2014 | Hancock |
| 2014/0058266 A1* | 2/2014 | Call ............ A61B 8/4427 600/443 |
| 2014/0073921 A1 | 3/2014 | Specht et al. |
| 2014/0086014 A1 | 3/2014 | Kobayashi |
| 2014/0147013 A1 | 5/2014 | Shandas et al. |
| 2014/0243673 A1 | 8/2014 | Anand et al. |
| 2015/0045668 A1 | 2/2015 | Smith et al. |
| 2015/0172878 A1 | 6/2015 | Luna et al. |
| 2015/0224346 A1 | 8/2015 | Coviello et al. |
| 2016/0093024 A1 | 3/2016 | Kang et al. |
| 2016/0223632 A1 | 8/2016 | Baek et al. |
| 2016/0228090 A1 | 8/2016 | Boctor et al. |
| 2017/0119352 A1 | 5/2017 | Anand et al. |
| 2017/0363725 A1 | 12/2017 | Ignjatovic et al. |
| 2018/0116631 A1 | 5/2018 | Taniguchi |
| 2018/0125451 A1 | 5/2018 | Duncan et al. |
| 2018/0153511 A1 | 6/2018 | Specht et al. |
| 2019/0082117 A1 | 3/2019 | Moore et al. |
| 2019/0200961 A1 | 7/2019 | Specht et al. |
| 2019/0211175 A1 | 7/2019 | Wang et al. |
| 2019/0251724 A1 | 8/2019 | Schreckenberg et al. |
| 2019/0261949 A1 | 8/2019 | Labyed |
| 2020/0069292 A1 | 3/2020 | Abolmaesumi et al. |
| 2020/0275910 A1 | 9/2020 | Specht et al. |
| 2020/0297320 A1 | 9/2020 | Specht et al. |
| 2021/0085292 A1 | 3/2021 | Davis et al. |
| 2021/0350101 A1 | 11/2021 | Call et al. |
| 2021/0378633 A1 | 12/2021 | Specht et al. |
| 2022/0071601 A1 | 3/2022 | Call et al. |
| 2022/0167949 A1 | 6/2022 | Belevich et al. |
| 2023/0248333 A1 | 8/2023 | Bajikar et al. |
| 2023/0270416 A1 | 8/2023 | Specht et al. |
| 2023/0277158 A1 | 9/2023 | Brewer et al. |
| 2024/0081787 A1 | 3/2024 | Specht et al. |

FOREIGN PATENT DOCUMENTS

| | | |
|---|---|---|
| CN | 1781460 A | 6/2006 |
| CN | 101103927 A | 1/2008 |
| CN | 101116622 A | 2/2008 |
| CN | 101190134 A | 6/2008 |
| CN | 101453955 A | 6/2009 |
| CN | 100545650 C | 9/2009 |
| CN | 101609150 A | 12/2009 |
| CN | 101852773 A | 6/2010 |
| CN | 101785684 A | 7/2010 |
| CN | 101843501 A | 9/2010 |
| CN | 101912278 A | 12/2010 |
| CN | 101965232 A | 2/2011 |
| CN | 102018533 A | 4/2011 |
| CN | 102112047 A | 6/2011 |
| CN | 102123668 A | 7/2011 |
| CN | 102258388 A | 11/2011 |
| CN | 102283679 A | 12/2011 |
| CN | 102599930 A | 7/2012 |
| CN | 103792288 A | 5/2014 |
| CN | 104080407 A | 10/2014 |
| CN | 104105449 A | 10/2014 |
| CN | 104620128 A | 5/2015 |
| DE | 102011114333 A1 | 3/2013 |
| EP | 1346689 A2 | 9/2003 |
| EP | 1944070 A1 | 7/2008 |
| EP | 1949856 A1 | 7/2008 |
| EP | 2058796 A2 | 5/2009 |
| EP | 2101191 A2 | 9/2009 |
| EP | 2182352 A2 | 5/2010 |
| EP | 2187813 A1 | 5/2010 |
| EP | 2198785 A1 | 6/2010 |
| EP | 1757955 B1 | 11/2010 |
| EP | 2319417 A1 | 5/2011 |
| EP | 2325672 A1 | 5/2011 |
| EP | 1462819 B1 | 7/2011 |
| EP | 2356941 A1 | 8/2011 |
| EP | 1979739 B1 | 10/2011 |
| EP | 2385391 A2 | 11/2011 |
| EP | 2294400 B1 | 2/2012 |
| EP | 2453256 A2 | 5/2012 |
| EP | 1840594 B1 | 6/2012 |
| EP | 2514368 A1 | 10/2012 |
| EP | 1850743 B1 | 12/2012 |
| EP | 1594404 B1 | 9/2013 |
| EP | 2026280 B1 | 10/2013 |
| FR | 2851662 A1 | 8/2004 |
| JP | 49-11189 A | 1/1974 |
| JP | 54-44375 A | 4/1979 |
| JP | 55-103839 A | 8/1980 |
| JP | 57-31848 A | 2/1982 |
| JP | 58-223059 A | 12/1983 |
| JP | 59-101143 A | 6/1984 |
| JP | 59-174151 A | 10/1984 |
| JP | 60-13109 U | 1/1985 |
| JP | 60-68836 A | 4/1985 |
| JP | 01164354 A | 6/1989 |
| JP | 02501431 A | 5/1990 |
| JP | 03015455 A | 1/1991 |
| JP | 03126443 A | 5/1991 |
| JP | 04017842 A | 1/1992 |
| JP | 04067856 A | 3/1992 |
| JP | 05042138 A | 2/1993 |
| JP | H05146437 A | 6/1993 |
| JP | 06125908 A | 5/1994 |
| JP | 06254092 A | 9/1994 |
| JP | 07051266 A | 2/1995 |
| JP | 07204201 A | 8/1995 |
| JP | H07204202 A | 8/1995 |
| JP | 08154930 A | 6/1996 |
| JP | 08252253 A | 10/1996 |
| JP | H0315455 A | 1/1997 |
| JP | 09103429 A | 4/1997 |
| JP | 09201361 A | 8/1997 |
| JP | 2777197 B | 5/1998 |
| JP | 10216128 A | 8/1998 |
| JP | 11089833 A | 4/1999 |
| JP | 11239578 A | 9/1999 |
| JP | 2001507794 A | 6/2001 |
| JP | 2001245884 A | 9/2001 |
| JP | 2002209894 A | 7/2002 |
| JP | 2002253548 A | 9/2002 |
| JP | 2002253549 A | 9/2002 |
| JP | 2003235839 A | 8/2003 |
| JP | 2003290224 A | 10/2003 |
| JP | 2004167092 A | 6/2004 |
| JP | 2004215987 A | 8/2004 |
| JP | 2004337457 A | 12/2004 |
| JP | 2004340809 A | 12/2004 |
| JP | 2004351214 A | 12/2004 |
| JP | 2005046192 A | 2/2005 |
| JP | 2005046193 A | 2/2005 |
| JP | 2005152187 A | 6/2005 |
| JP | 2005523792 A | 8/2005 |
| JP | 2005526539 A | 9/2005 |
| JP | 2006051356 A | 2/2006 |
| JP | 2006061203 A | 3/2006 |
| JP | 2006122657 A | 5/2006 |
| JP | 2006130313 A | 5/2006 |
| JP | 2006204923 A | 8/2006 |
| JP | 2007325937 A | 12/2007 |
| JP | 2008122209 A | 5/2008 |
| JP | 2008513763 A | 5/2008 |
| JP | 2008515557 A | 5/2008 |
| JP | 2008132342 A | 6/2008 |
| JP | 2008522642 A | 7/2008 |
| JP | 2008259541 A | 10/2008 |
| JP | 2008279274 A | 11/2008 |
| JP | 2008307087 A | 12/2008 |

(56) References Cited

FOREIGN PATENT DOCUMENTS

| | | | |
|---|---|---|---|
| JP | 2009178448 A | 8/2009 |
| JP | 2009240667 A | 10/2009 |
| JP | 2010005375 A | 1/2010 |
| JP | 2010124842 A | 6/2010 |
| JP | 2010526626 A | 8/2010 |
| JP | 2010227503 A | 10/2010 |
| JP | 2011527586 A | 11/2011 |
| JP | 2011529362 A | 12/2011 |
| JP | 2013118984 A | 6/2013 |
| JP | 2013121493 A | 6/2013 |
| JP | 2015532607 A | 2/2014 |
| JP | 2014087448 A | 5/2014 |
| JP | 2015500062 A | 1/2015 |
| JP | 2018068852 A | 5/2018 |
| JP | 2018512943 A | 5/2018 |
| JP | 2018118081 A | 8/2018 |
| JP | 2019111104 A | 7/2019 |
| JP | 2020014857 A | 1/2020 |
| KR | 100715132 B | 4/2007 |
| KR | 1020080044737 A | 5/2008 |
| KR | 1020090009258 A | 1/2009 |
| KR | 1020090103408 A | 10/2009 |
| KR | 1020100051108 A | 5/2010 |
| KR | 1020130060875 A | 6/2013 |
| KR | 1020130089645 A | 8/2013 |
| KR | 1020140034114 A | 3/2014 |
| KR | 1020140069664 A | 6/2014 |
| KR | 1020140098843 A | 8/2014 |
| WO | WO92/18054 A1 | 10/1992 |
| WO | WO98/00719 A2 | 1/1998 |
| WO | WO01/64109 A1 | 9/2001 |
| WO | WO02/17296 A1 | 2/2002 |
| WO | WO02/084594 A2 | 10/2002 |
| WO | WO2005/009245 A1 | 2/2005 |
| WO | WO2006/113445 A1 | 10/2006 |
| WO | WO2006/114735 A1 | 11/2006 |
| WO | WO2007/013814 A2 | 2/2007 |
| WO | WO2007/127147 A2 | 11/2007 |
| WO | WO2008/097479 A1 | 8/2008 |
| WO | WO2008/127927 A1 | 10/2008 |
| WO | WO2008/137030 A1 | 11/2008 |
| WO | WO2009/060182 A1 | 5/2009 |
| WO | WO2010/095094 A1 | 8/2010 |
| WO | WO2010/137453 A1 | 12/2010 |
| WO | WO2010/139519 A1 | 12/2010 |
| WO | WO2011/004661 A1 | 1/2011 |
| WO | WO2011/057252 A1 | 5/2011 |
| WO | WO2011/064688 A1 | 6/2011 |
| WO | WO2011/094585 A | 8/2011 |
| WO | WO2011/100697 A1 | 8/2011 |
| WO | WO2011/123529 A1 | 10/2011 |
| WO | WO2012/028896 A1 | 3/2012 |
| WO | WO2012/033093 A1 | 3/2012 |
| WO | WO2012/049124 A2 | 4/2012 |
| WO | WO2012/049612 A2 | 4/2012 |
| WO | WO2012/078639 A1 | 6/2012 |
| WO | WO2012/091280 A1 | 7/2012 |
| WO | WO2012/112540 A2 | 8/2012 |
| WO | WO2012/131340 A2 | 10/2012 |
| WO | WO2012/160541 A2 | 11/2012 |
| WO | WO2013/030556 A1 | 3/2013 |
| WO | WO2013/059358 A2 | 4/2013 |
| WO | WO2013/109965 A1 | 7/2013 |
| WO | WO2013/116807 A1 | 8/2013 |
| WO | WO2013/116809 A1 | 8/2013 |
| WO | WO2013/116851 A1 | 8/2013 |
| WO | WO2013/116854 A1 | 8/2013 |
| WO | WO2013/116866 A1 | 8/2013 |
| WO | WO2013/126559 A1 | 8/2013 |
| WO | WO2013/128301 A2 | 9/2013 |
| WO | WO2022/086521 A1 | 4/2022 |

OTHER PUBLICATIONS

Smith et al.; U.S. Appl. No. 18/344,278 entitled "Concave ultrasound transducers and 3d arrays," filed Jun. 29, 2023.

Call et al.; U.S. Appl. No. 18/344,479 entitled "Ultrasound imaging systems and methods for detecting object motion," filed Jun. 29, 2023.

Specht et al.; U.S. Appl. No. 18/588,967 entitled "Determining material stiffness using multiple aperaure ultrasound," filed Feb. 27, 2024.

Abeysekera et al.; Alignment and calibration of dual ultrasound transducers using a wedge phantom; Ultrasound in Medicine and Biology; 37(2); pp. 271-279; Feb. 2011.

Arigovindan et al.; Full motion and flow field recovery from echo doppler data; IEEE Transactions on Medical Imaging; 26(1); pp. 31-45; Jan. 2007.

Capineri et al.; A doppler system for dynamic vector velocity maps; Ultrasound in Medicine & Biology; 28(2); pp. 237-248; Feb. 28, 2002.

Carson et al.; Measurement of photoacoustic transducer position by robotic source placement and nonlinear parameter estimation; Biomedical Optics (BiOS); International Society for Optics and Photonics (9th Conf. on Biomedical Thermoacoustics, Optoacoustics, and Acousto-optics; vol. 6856; 9 pages; Feb. 28, 2008.

Chen et al.; Maximum-likelihood source localization and unknown sensor location estimation for wideband signals in the near-field; IEEE Transactions on Signal Processing; 50(8); pp. 1843-1854; Aug. 2002.

Chen et al.; Source localization and tracking of a wideband source using a randomly distributed beamforming sensor array; International Journal of High Performance Computing Applications; 16(3); pp. 259-272; Fall 2002.

Cristianini et al.; An Introduction to Support Vector Machines; Cambridge University Press; pp. 93-111; Mar. 2000.

Dunmire et al.; A brief history of vector doppler; Medical Imaging 2001; International Society for Optics and Photonics; pp. 200-214; May 30, 2001.

Dunmire et al.; Cross-beam vector Doppler ultrasound for angle-independent velocity measurements; Ultrasound in medicine & biology; 26(8); pp. 1213-1235; Oct. 2000.

Du et al.; User parameter free approaches to multistatic adaptive ultrasound imaging; 5th IEEE International Symposium; pp. 1287-1290, May 2008.

Feigenbaum, Harvey, M.D.; Echocardiography; Lippincott Williams & Wilkins; Philadelphia; 5th Ed.; pp. 482, 484; Feb. 1994.

Fernandez et al.; High resolution ultrasound beamforming using synthetic and adaptive imaging techniques; Proceedings IEEE International Symposium on Biomedical Imaging; Washington, D.C.; pp. 433-436; Jul. 7-10, 2002.

Gazor et al.; Wideband multi-source beamforming with array location calibration and direction finding; Conference on Acoustics, Speech and Signal Processing ICASSP-95; Detroit, MI; vol. 3 IEEE; pp. 1904-1907; May 9-12, 1995.

Gran et al.; Directional velocity estimation using a spatio-temporal encoding technique based on frequency division for synthetic transmit aperture ultrasound; IEEE transactions on ultrasonics, ferroelectrics, and frequency control; 53(7); pp. 1289-1299; Aug. 2006.

Haykin, Simon; Neural Networks: A Comprehensive Foundation (2nd Ed.); Prentice Hall; pp. 156-187; Jul. 16, 1998.

Heikkila et al.; A four-step camera calibration procedure with implicit image correction; Proceedings IEEE Computer Scociety Conference on Computer Vision and Pattern Recognition, San Juan; pp. 1106-1112; Jun. 17-19, 1997.

Hendee et al.; Medical Imaging Physics; Wiley-Liss, Inc. 4th Edition; Chap. 19-22; pp. 303-353; © 2002 (the year of publication is sufficiently earlier than the effective U.S. filing date and any foreign priority date so that the particular month of publication is not in issue).

Holzner; How to Find Vector Components; 5 pages; retrieved from the internet (https://www.dummies.com/education/science/physics/how-to-find-vector-components/); Mar. 2021.

(56) References Cited

OTHER PUBLICATIONS

Hsu et al.; Real-time freehand 3D ultrasound calibration; CUED/F-INFENG/TR 565; Department of Engineering, University of Cambridge, United Kingdom; 14 pages; Sep. 2006.
Jeffs; Beamforming: a brief introduction; Brigham Young University; 14 pages; retrieved from the internet (http://ens.ewi.tudelft.nl/Education/courses/et4235/Beamforming.pdf); Oct. 2004.
Jensen et al.; Synthetic aperture ultrasound imaging; Ultrasonics; vol. 44; pp. e5-e15; Dec. 22, 2006.
Khamene et al.; A novel phantom-less spatial and temporal ultrasound calibration method; Medical Image Computing and Computer-Assisted Intervention—MICCAI (Proceedings 8th Int. Conf.); Springer Berlin Heidelberg; Palm Springs, CA; pp. 65-72; Oct. 26-29, 2005.
Kramb et al,.; Considerations for using phased array ultrasonics in a fully automated inspection system. Review of Quantitative Nondestructive Evaluation, 2004 Edition, ed. D. O. Thompson and D. E. Chimenti, American Inst. of Physics, pp. 817-825, Mar. 2004.
Ledesma-Carbayo et al.; Spatio-temporal nonrigid registration for ultrasound cardiac motion estimation; IEEE Trans. on Medical Imaging; vol. 24; No. 9; Sep. 2005.
Leotta et al.; Quantitative three-dimensional echocardiography by rapid imaging . . . ; J American Society of Echocardiography; vol. 10; No. 8; pp. l 830-l 839; Oct. 1997.
Li et al.; An efficient speckle tracking algorithm for ultrasonic imaging; 24; pp. 215-228; Oct. 1, 2002.
Morrison et al.; A probabilistic neural network based image segmentation network for magnetic resonance images; Proc. Conf. Neural Networks; Baltimore, MD; vol. 3; pp. 60-65; Jun. 1992.
Nadkarni et al.; Cardiac motion synchronization for 3D cardiac ultrasound imaging; Ph.D. Dissertation, University of Western Ontario; Jun. 2002.
Opretzka et al.; A high-frequency ultrasound imaging system combining limited-angle spatial compounding and model-based synthetic aperture focusing; IEEE Transactions on Ultrasonics, Ferroelectrics and Frequency Control, IEEE, US; 58(7); pp. 1355-1365; Jul. 2, 2011.
Pinghua; Optimization of Key Parameters of Phased array Ultrasonic Testing; Dalian University of Technology; Masters Dissertation; No. 7; retrieved from the internet (http://www.cnki.net); 69 pages; Jul. 15, 2012.
Press et al.; Cubic spline interpolation; §3.3 in "Numerical Recipes in FORTRAN: The Art of Scientific Computing", 2nd Ed.; Cambridge, England; Cambridge University Press; pp. 107-110; Sep. 1992.
Saad et al.; Computer vision approach for ultrasound doppler angle estimation; Journal of Digital Imaging; 22(6); pp. 681-688; Dec. 1, 2009.
Sakas et al.; Preprocessing and volume rendering of 3D ultrasonic data; IEEE Computer Graphics and Applications; pp. 47-54, Jul. 1995.
Sapia et al.; Deconvolution of ultrasonic waveforms using an adaptive wiener filter; Review of Progress in Quantitative Nondestructive Evaluation; vol. 13A; Plenum Press; pp. 855-862; Jan. 1994.
Sapia et al.; Ultrasound image deconvolution using adaptive inverse filtering; 12 IEEE Symposium on Computer-Based Medical Systems, CBMS, pp. 248-253; Jun. 1999.
Sapia, Mark Angelo; Multi-dimensional deconvolution of optical microscope and ultrasound imaging using adaptive least-mean-square (LMS) inverse filtering; Ph.D. Dissertation; University of Connecticut; Jan. 2000.
Scabia et al.; A real-time two-dimensional pulsed-wave Doppler system; Ultrasound in medicine & biology; 26(1); pp. 121-131; Jan. 1, 2000.
Slavine et al.; Construction, calibration and evaluation of a tissue phantom with reproducible optical properties for investigations in light emission tomography; Engineering in Medicine and Biology Workshop; Dallas, TX; IEEE pp. 122-125; Nov. 11-12, 2007.
Smith et al.; High-speed ultrasound volumetric imaging system. 1. Transducer design and beam steering; IEEE Trans. Ultrason., Ferroelect., Freq. Contr.; vol. 38; pp. 100-108; Mar. 1991.
Specht et al.; Deconvolution techniques for digital longitudinal tomography; SPIE; vol. 454; presented at Application of Optical Instrumentation in Medicine XII; pp. 319-325; Jun. 1984.
Specht et al.; Experience with adaptive PNN and adaptive GRNN; Proc. IEEE International Joint Conf. on Neural Networks; vol. 2; pp. 1203-1208; Orlando, FL; Jun. 1994.
Specht, D.F.; A general regression neural network; IEEE Trans. on Neural Networks; vol. 2.; No. 6; Nov. 1991.
Specht, D.F.; Blind deconvolution of motion blur using LMS inverse filtering; Lockheed Independent Research (unpublished); Jun. 23, 1975.
Specht, D.F.; Enhancements to probabilistic neural networks; Proc. IEEE International Joint Conf. on Neural Networks; Baltimore, MD; Jun. 1992.
Specht, D.F.; GRNN with double clustering; Proc. IEEE International Joint Conf. Neural Networks; Vancouver, Canada; Jul. 16-21, 2006.
Specht, D.F.; Probabilistic neural networks; Pergamon Press; Neural Networks; vol. 3; pp. 109-118; Feb. 1990.
Stern; The basic concepts of diagnostic ultrasound. Yale-New Haven Teachers Institute; Apr. 2005.
UCLA Academic Technology; SPSS learning module: How can I analyze a subset of my data; 6 pages; retrieved from the internet (http://www.ats.ucla.edu/stat/spss/modules/subset_analyze.htm) Nov. 26, 2001.
Urban et al; Implementation of vibro-acoustography on a clinical ultrasound system; IEEE Transactions on Ultrasonics, Ferroelectrics, and Frequency Control; 58(6); pp. 1169-1181 (Author Manuscript, 25 pgs.); Jun. 2011.
Urban et al; Implementation of vibro-acoustography on a clinical ultrasound system; IEEE Ultrasonics Symposium (IUS); pp. 326-329; Oct. 14, 2010.
Von Ramm et al.; High-speed ultrasound volumetric imaging-System. 2. Parallel processing and image display; IEEE Trans. Ultrason., Ferroelect., Freq. Contr.; vol. 38; pp. 109-115; Mar. 1991.
Wang et al.; Photoacoustic tomography of biological tissues with high cross-section resolution: reconstruction and experiment; Medical Physics; 29(12); pp. 2799-2805; Dec. 2002.
Wells, P.N.T.; Biomedical ultrasonics; Academic Press; London, New York, San Francisco; pp. 124-125; Mar. 1977.
Widrow et al.; Adaptive signal processing; Prentice-Hall; Englewood Cliffs, NJ; pp. 99-116; Mar. 1985.
Wikipedia; Point cloud; 2 pages; retrieved Nov. 24, 2014 from the internet (https://en.wikipedia.org/w/index.php?title=Point_cloud&oldid=472583138).
Wikipedia; Curve fitting; 5 pages; retrieved from the internet (http:en.wikipedia.org/wiki/Curve_fitting) Dec. 19, 2010.
Wikipedia; Speed of sound; 17 pages; retrieved from the internet (http:en.wikipedia.org/wiki/Speed_of_sound) Feb. 15, 2011.
Yang et al.; Time-of-arrival calibration for improving the microwave breast cancer imaging; 2011 IEEE Topical Conf. on Biomedical Wireless Technologies, Networks, and sensing Systems (BioWireleSS); Phoenix, AZ; pp. 67-70; Jan. 16-19, 2011.
Zhang et al.; A high-frequency high frame rate duplex ultrasound linear array imaging system for small animal imaging; IEEE transactions on ultrasound, ferroelectrics, and frequency control; 57(7); pp. 1548-1567; Jul. 2010.
Zhang et al.; Synthetic-aperture based photoacoustic re-beamforming (SPARE) approach using beamformed ultrasound data; Biomedical optics express; 7(8); pp. 3056-3068; Aug. 1, 2016.
Specht et al.; U.S. Appl. No. 18/250,071 entitled "Systems and methods for tissue characterization using multiple aperture ultrasound," filed Apr. 21, 2023.
Call et al.; U.S. Appl. No. 18/330,699 entitled "Network-based ultrasound imaging system," filed Jun. 7, 2023.
Czerwinski et al.; Detection of lines and boundaries in speckle images-application to medical ultrasound, IEEE transactions on medical imaging; 18(2); pp. 126-136, Feb. 1999.

(56) References Cited

OTHER PUBLICATIONS

Narayan et al.; Speckle in ultrasound images: Friend or Foe?; In 2014 IEEE International Conference on Image Processing (ICIP): pp. 5816-5820; Oct. 27, 2014.
Zhao et al.; Shear wave speed measurement using an unfocused ultrasound beam; Ultrasound in medicine & biology; 38(9); pp. 1646-1655; Sep. 1, 2012.
Davis et al.; U.S. Appl. No. 18/763,696 entitled "Ultrasound imaging with sparse array probes," filed Jul. 3, 2024.
Specht et al.; U.S. Appl. No. 18/646,623 entitled "Point source transmission and speed-of-sound correctionusing multi-aperture ultrasound imaging," filed Apr. 25, 2024.
Belevich et al.; U.S. Appl. No. 18/948,323 entitled "Calibration of multiple aperture ultrasound probes," filed Nov. 14, 2024.
Call et al.; U.S. Appl. No. 18/955,146 entitled "Systems and methods for improving ultrasound image quality by applying weighting factors," filed Nov. 21, 2024.

* cited by examiner

SYSTEMS AND METHODS FOR IMPROVING ULTRASOUND IMAGE QUALITY

CROSS-REFERENCE TO RELATED APPLICATIONS

This application claims the benefit of U.S. Provisional Patent Application No. 63/108,809, filed Nov. 2, 2020, titled "Systems and Methods for Improving Ultrasound Image Quality", herein incorporated by reference in its entirety.

This application is also related to the following US Patent Applications: U.S. Pat. No. 8,007,439 titled "Method and Apparatus to Produce Ultrasonic Images Using Multiple Apertures"; U.S. Pat. No. 9,247,926 titled "Multiple Aperture Medical Ultrasound Transducers"; U.S. Pat. No. 9,146,313 titled "Point Source Transmission and Speed-of-Sound Correction Using Multi-Aperture Ultrasound Imaging"; U.S. Pat. No. 9,668,714 titled "Systems and Methods for Improving Ultrasound Image Quality by Applying Weighting Factors"; U.S. Pat. No. 9,986,969 titled "Ultrasound Imaging System Memory Architecture"; U.S. Pat. No. 9,572,549 titled "Calibration of Multiple Aperture Probes"; U.S. Pat. No. 9,510,806 titled "Alignment of Ultrasound Transducer Arrays and Multiple Aperture Probe Assembly"; U.S. Pat. No. 9,883,848 titled "Ultrasound Imaging Using Apparent Point-Source Transmit Transducer"; U.S. Pat. No. 10,401,493 titled "Network-Based Ultrasound Imaging System"; U.S. Pat. No. 10,380,399 titled "Ultrasound Imaging Systems and Methods for Detecting Object Motion"; and US Patent Application Publication 2017/0209121 titled "Ultrasound Imaging with Sparse Arrays". The entire contents of each of these patents and patent applications is incorporated herein by reference. These related applications may be referred to herein as "Applicant's prior patents and applications."

INCORPORATION BY REFERENCE

Unless otherwise specified herein, all patents, publications and patent applications mentioned in this specification are herein incorporated by reference to the same extent as if each individual publication or patent application was specifically and individually indicated to be incorporated by reference.

FIELD

This invention generally relates to ultrasound imaging and more particularly to systems and methods for improving ultrasound imaging quality by minimizing noise.

BACKGROUND

In conventional ultrasonic imaging, a focused beam of ultrasound energy is transmitted into body tissues to be examined and the returned echoes are detected and plotted to form an image. While ultrasound has been used extensively for diagnostic purposes, conventional ultrasound has been greatly limited by depth of scanning, speckle noise, poor lateral resolution, obscured tissues and other such problems.

In order to insonify body tissues, an ultrasound beam is typically formed and focused either by a phased array or a shaped transducer. Phased array ultrasound is a commonly used method of steering and focusing a narrow ultrasound beam for forming images in medical ultrasonography. A phased array probe has many small ultrasonic transducer elements, each of which can be pulsed individually. By varying the timing of ultrasound pulses (e.g. by pulsing elements one by one in sequence along a row), a pattern of constructive interference is set up that results in a beam directed at a chosen angle. This is known as beam steering. Such a steered ultrasound beam may then be swept through the tissue or object being examined. Data from multiple beams are then combined to make a visual image showing a slice through the object.

Traditionally, the same transducer or array used for transmitting an ultrasound beam is used to detect the returning echoes. This design configuration lies at the heart of one of the most significant limitations in the use of ultrasonic imaging for medical purposes: poor lateral resolution. Theoretically, the lateral resolution could be improved by increasing the width of the aperture of an ultrasonic probe, but practical problems associated with increased aperture sizes have kept apertures small. Unquestionably, ultrasonic imaging has been very useful even with this limitation, but it could be more effective with better resolution.

Significant improvements have been made in the field of ultrasound imaging with the creation of multiple aperture imaging, examples of which are shown and described in Applicant's prior patents and applications. Multiple aperture imaging methods and systems allow for ultrasound signals to be both transmitted and received via separate apertures.

SUMMARY OF THE DISCLOSURE

A method of reducing noise in ultrasound imaging is provided, comprising the steps of transmitting a first unfocused ultrasound pulse with a multiple-aperture ultrasound array into a region of interest having one or more types of tissue including bones, receiving echoes from the region of interest with one or more receive elements of the multiple-aperture ultrasound array, forming a digital data set for a plurality of pixels in the region of interest for each of the one or more receive elements, conducting an average of all the digital data sets, applying a control to mask data values from the digital data sets using a predetermined mathematical condition that includes or excludes data, producing a masked data set output, and beamforming the masked data set output to produce one or more ultrasound images.

In some embodiments, the predetermined mathematical condition masks data based on a percentage of the average of each digital data set.

In another embodiment, the predetermined mathematical condition eliminates data that falls outside of a predetermined percentage of the average.

In some embodiments, the masked data set output produces one or more 3D ultrasound images.

In some examples, the predetermined mathematical condition masks data based on a percentage of the average of each digital data set.

In one embodiment, the beamforming is performed in real time, and wherein new data may be used to change or select a new masked data set output.

In some examples, the method further includes adjusting the masked data values.

In one embodiment, the method includes transmitting a second unfocused ultrasound pulse into the region of interest and receiving echoes from the region of interest with one or more receive elements.

In some embodiments, beamforming the masked data set output produces an image of all or a subset of the region of interest.

In one embodiment, the echoes may be received from one or more elements of the same array.

In another embodiment, the first unfocused ultrasound pulse is transmitted with more ultrasound transducers than the second unfocused ultrasound pulse.

In some examples, the second unfocused ultrasound pulse is transmitted with more ultrasound transducers than the first unfocused ultrasound pulse.

A method of reducing noise in ultrasound imaging is provided, comprising the steps of transmitting a first unfocused ultrasound pulse with a multiple-aperture ultrasound array into a region of interest having one or more types of tissue, receiving echoes from the region of interest with one or more receive elements of the multiple-aperture ultrasound array, forming a first digital data set for echoes received by a first receiver element, forming a second digital data set for echoes received by a second receiver element, identifying groups of similar data in the first and second digital data sets, correlating the similar data where common values are shared between the first and second digital data sets, masking data where common values are shared, reducing gap values in the first and second digital data sets to zero or another value, producing a masked data set output, and beamforming the masked data set output to produce one or more ultrasound images.

A method of reducing noise in ultrasound imaging is provided, comprising the steps of transmitting a first unfocused ultrasound pulse with a multiple-aperture ultrasound array into a region of interest having one or more types of tissue, receiving echoes from the region of interest with one or more receive elements of the multiple-aperture ultrasound array, forming a first digital data set for echoes received by a first receiver element, forming a second digital data set for echoes received by a second receiver element, identifying groups of similar data in the first and second digital data sets, correlating the similar data where common values are shared between the first and second digital data sets, masking data where common values are shared, keeping only data retained from gaps between the first and second digital data sets, producing a masked data set output, and beamforming the masked data set output to produce one or more ultrasound images.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
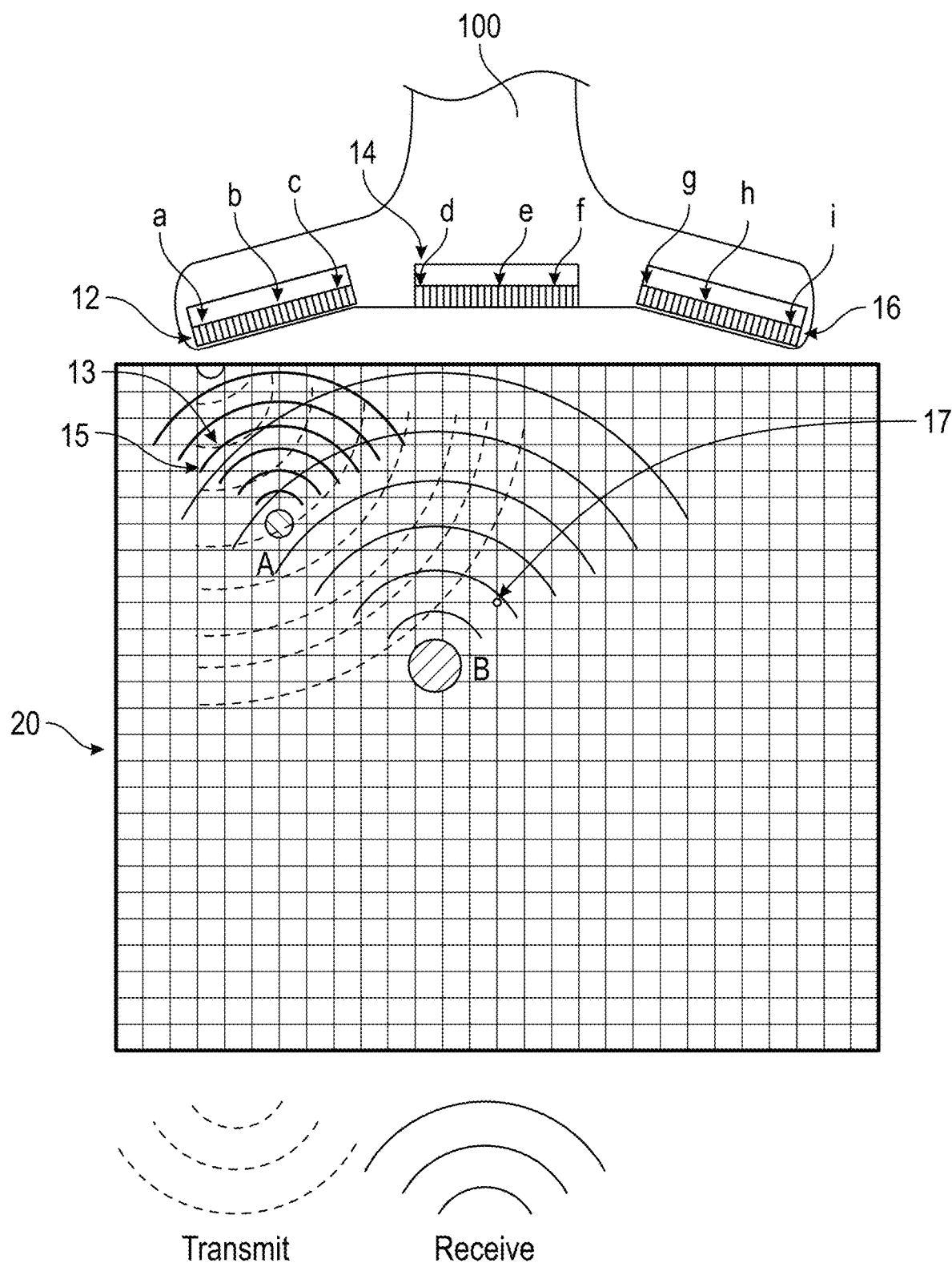
FIG. 1A is a schematic illustration of a multiple aperture imaging probe with three transducer arrays and several points to be imaged.

The various embodiments will be described in detail with reference to the accompanying drawings. References made to particular examples and implementations are for illustrative purposes, and are not intended to limit the scope of the invention or the claims.

The present disclosure provides systems and methods for improving the quality of ultrasound images produced by ping-based multiple aperture imaging ("PMA" imaging) systems by mitigating or eliminating noise in a target image point (i.e., a given pixel or voxel), where such noise is caused by a temporally-neighboring structure with a very different echogenic character than the target image point. Such noise will be referred to herein as "neighbor noise."

As described in more detail below and in Applicant's prior patents and applications, PMA imaging involves transmission of ultrasound "pings," echoes of which may be received by receive elements located at some distance from the transmitter. Each received echo signal lies along an ellipse defined by the transmitter and receiver positions and the time interval between ping transmission and echo reception. An image may be formed by combining such ellipses (i.e., data samples) in a way that their intersections become emphasized. Each intersection may be an image point in a two-dimensional or three-dimensional image. However, if one erroneous ellipse has a substantially higher or lower value than others contributing to the same image point, the erroneous ellipse's value may dominate and cause the image point to be brighter or darker than the real object represented by the image point.

An erroneous ellipse may contribute to an image point when both a bright object and a dark object lie on the same temporal ellipse (i.e., "neighboring ellipses"). This may occur due to differences in materials or different structures along paths between transmitter, reflector object, and receiver, or due to brighter and darker reflectors being located near one another within an imaged region of interest. For example, this phenomenon may become problematic when imaging a spinal cord immediately inside the epidural space and surrounded by strong reflectors of the vertebral bones. Similarly, when imaging inside a skull using PMA systems, a (relatively dim) ventricle of the brain may not be distinguishable from the (relatively bright) skull when the ventricle is located immediately next to the interior surface of the skull. In these and many other imaging scenarios, a summation for a given image point representative of a given reflector may inadvertently include one or more ellipses representative of a neighboring structure with a substantially different echogenic character (i.e., substantially brighter or darker) than the given reflector. This "neighbor noise" phenomenon can have the effect of blurring edges and obscuring real structures that might otherwise be visible in the image.

In some embodiments, neighbor noise may be mitigated or eliminated by evaluating data samples contributing to an image or an image region to identify data samples containing an unacceptable degree of neighbor noise. Once identified, the impact of such neighbor noise data samples on a final image may be minimized. In some embodiments, sub-visual data analysis may be used to identify data samples, groups of data samples, or image point regions likely to contain data samples with substantial neighbor noise.

Noisy data samples may generally be identified by mapping all collected data samples to respective image points (e.g., pixels or voxels), then for each image point, collectively evaluating the set of data samples contributing to the image point and identifying individual data samples containing unacceptably high levels of noise relative to the set. Once identified, the impact of noisy data samples on a final image may be mitigated or eliminated by adjusting, weighting, ignoring, or otherwise modifying the value of the noisy data sample. Various examples and embodiments of such methods are described herein.

Although the various embodiments are described herein with reference to ultrasound imaging of various anatomic structures or implanted medical devices, it will be understood that many of the methods and devices shown and described herein may also be used in other applications, such as imaging and evaluating non-anatomic structures and objects.

Ping-Based Multiple Aperture Imaging

Some embodiments of the systems and methods described herein are based on a unique imaging modality referred to as ping-based multiple aperture imaging ("PMA" imaging). An introductory description of ping-based multiple-aperture imaging is provided below. Additional details, examples, embodiments, and applications of methods and structures useful in performing ping-based multiple aperture imaging are described in Applicant's prior patent applications referenced above.

Briefly, PMA imaging involves transmitting a series of un-focused two-dimensional or three-dimensional "pings" into a medium from a "transmit aperture" (which may be made up of one transducing structure or a group of transducers operating in concert) then receiving and storing signals produced by echoes and/or through-transmissions of each ping. Signals are received by many "receive elements" (each made up of one or more transducing structures) which may be grouped into "apertures." The receiving transducers produce time-varying analog signals with amplitudes proportional to an intensity of energy impinging on the transducer. Such analog signals may be digitally sampled at a sampling rate, and digital samples may then be stored. The value of each digital sample may be proportional to the intensity of received ultrasound. Each digital sample may represent an "echo" of some reflective or transmissive structure in the medium. Digital samples received by a single receive transducer element may be organized in "strings" of data samples, which may be sub-divided into "sub-strings" as described in some embodiments herein. An image may be formed by mapping the samples to locations within the imaged medium and assigning brightness (and/or color) values to each image point (e.g., a pixel or voxel) in proportion to the value of contributing data samples.

While terms such as "bright" and "dark" are used herein to refer to image points and data samples, the skilled artisan will recognize that such terms are not absolute, as the brightness or contrast of a displayed image may be adjusted. Instead, the terms are used in a relative sense to distinguish those data samples and image points representative of highly reflective or "echogenic" structures which are typically but not necessarily referred to as being more "bright" than minimally-reflective structures which are typically but not necessarily referred to as "dark." Of course, some imaging systems may be configured with an opposite convention in which samples with greater energy intensity are displayed as dark points while samples with less energy intensity are displayed as brighter points. In either convention, in the context of the systems and methods described herein, the term "bright" is intended to refer to points representing points of greater received energy intensity (regardless of whether the energy is received after reflection from or transmission through an imaged structure), while "darker" points are those with relatively lower received energy intensity.

Beamforming Images in from Ping Based Multiple Aperture Imaging Systems

A complete sub-image of the medium may be obtained from signals produced by each receive element. Sub-images obtained from elements of a common aperture may be combined with one another to produce a "first-level" image. Sub-images and/or first-level images from multiple ping-transmissions (transmitted from the same or different transmit apertures) may be combined to produce "second-level" images. Second-level images from multiple receive apertures may be combined to produce "third-level" images. Many permutations of image-layer combination sequences are possible and therefore sub, first, second, and third level images need not necessarily be formed in the sequence implied by the names.

If the transmit elements and/or the receive elements are spaced from one another in two or three dimensions, the "images" (including sub-images) may be three-dimensional volumes made up of three-dimensional voxels. Any two-dimensional section of such a volume may be selected and displayed as a matrix of two-dimensional pixels. The term "image point" will be used to refer to discrete elements (e.g., pixels or voxels) of a two-dimensional or three-dimensional image.

As signals are received by a transducer element, the signals may be converted into a sequence of digital data, which may be stored in a volatile and/or non-volatile memory device. Each entry in such a sequence of data entries may be referred to as a "data sample". The term "data sample" may also refer to values obtained by aggregating multiple data entries (e.g., averaging, taking a minimum or a maximum, etc.) or values obtained by interpolating between two or more data entries.

In order to form a sub-image from a collection data samples, each sample (individually, aggregated, or interpolated) must be mapped to its possible location within the image through a process referred to herein as "beamforming." Each data sample represents a range of potential locations (a locus) within the image determined by the location of the transmit element and receive element, the difference in time between ping transmission and signal reception, and the speed-of-sound through the imaged medium.

In a multiple aperture imaging system in which the transmitter is located at a different point than the receiver, the locus of possible locations for each sample takes the shape of a two-dimensional ellipse or a three-dimensional ellipsoid with the transmit element and the receive element located at the foci of the ellipse or ellipsoid reference U.S. Pat. No. 9,146,313 titled "Point Source Transmission and Speed-of-Sound Correction Using Multiple-Aperture Ultrasound Imaging. The term "locus" (and its plural "loci") will be used to refer to either an ellipse or an ellipsoid. The imaging system converges on the correct location of each image point by adding together multiple data samples with loci intersecting the same image point. Each data sample contributing to a single image point may be referred to as a "contributor" to that image point. The point at which the ellipses or ellipsoids intersect is reinforced (i.e. has a greater total brightness than its individual contributors) and represents the correct location of the point to be displayed or recorded.

This process is susceptible to a unique form of error referred to herein as neighbor noise. If a particular data sample contains a high degree of noise causing its locus to be substantially brighter than other contributors to an image point, a larger region of the neighbor noise sample may be displayed, creating a noise artifact in the shape of the locus. Such individual neighbor noise samples may create significant distortions of an image by highlighting regions that do not correspond to physical structure in the imaged medium. Distortions caused by neighbor noise may be identified through any of a number of techniques, some of which are described below. Once identified, neighbor noise can be minimized when forming an image by one or more of the techniques described herein.

Identifying Neighbor Noise Data Samples by Averaging

Highly echogenic reflectors that are substantially brighter than other contributors to the same image points are a problem that can cause neighbor noise. Here a "too bright" contributor that is overwhelming other contributors may create bright artifacts or other false information. This is particularly problematic for image points that would otherwise be relatively "dark" but-for the strong echogenic reflector located in the data samples. In an opposite but related fashion, less-echogenic reflectors can be erroneously displayed as much darker than expected because other contributors to the same image point will tend to cancel the effects of a "too dark" contributor. In both cases therefore, it may be beneficial to identify data samples (or ellipses) representing neighbor noise.

In general, for a single image point, data samples resulting from different combinations of transmitted ping and receive element may reveal brighter or darker echoes of a reflector due to differences in path length, look angle, obstacles, materials, time of ping transmission, or other factors. Nonetheless, under normal conditions, the degree of such variations can be expected to remain within predictable ranges which may be determined based on empirical testing and/or mathematical modeling/simulation. Echo values that fall significantly outside of such expected ranges are likely to be noise or other forms of error. Therefore, it may be desirable to systematically define "abnormally bright" values, identify data samples contributing "abnormally bright" values to any image point, and to minimize the deleterious impact of such abnormally bright samples.

In some embodiments, instead of evaluating every image point within the medium for high noise, the set of image points to be evaluated may be reduced to a candidate set of image points. For example, in some embodiments image points with brightness values less than a pre-determined value (e.g., ≤0.9 on a scale of 0.0 to 1.0) may be selected for analysis to detect neighbor noise contributors. In other embodiments, image points with brightness values greater than a predetermined lower value (e.g., 0.1 on a scale of 0.0 to 1.0) but less than a pre-determined upper value (e.g., 0.8) may be selected for analysis to detect neighbor noise contributors.

In some embodiments, image points to be evaluated for the existence of neighbor noise data samples may be identified based on an analysis of adjacent image points, or image points within a region. For example, if after applying all contributors, a particular image point has a brightness value substantially higher than all adjacent image points or all image points within a region, that image point may be selected for evaluation of contributors as possible neighbor noise contributors. In other embodiments, an image point to be evaluated for the existence of neighbor noise data samples may be identified by evaluating data samples contributing to a group of image points in a region so as to detect an "edge" between relatively darker and lighter image points in the region. An example of such a process is described in the section below.

Whether evaluating all image points or a sub-set of image points selected by a method such as those described above, various processes may be used for identifying neighbor noise contributors to a particular image point. In one example embodiment, such a process may comprise transmitting a ping from a transmit aperture, receiving reflected and/or transmitted signals from the ping, digitizing and storing sampled digital data representing the received signals, and beamforming the stored data to map data samples to image points. Then for each image point to be evaluated: determining an aggregate value of the set of data samples contributing to the image point, and identifying neighbor noise contributors as those data samples with values varying from the aggregate value by greater than an expected variance.

In various embodiments, the step of evaluating data samples to identify neighbor noise contributors may be performed before and/or after various coherent or incoherent summation steps as described in the various applications referenced above and incorporated herein by reference. For example, in some embodiments, raw data samples may be evaluated before any data summation steps in order to detect edge regions or other distinguishable features with a much greater degree of detail than may be possible after data summation.

In various embodiments, the "aggregate value" of a set of data samples contributing to a particular image point may be the arithmetic mean (simple average), median (the midpoint of all values of samples in the set), the mode (the most frequent value in the set), the maximum (the largest value of the set), the minimum (the smallest value of the set) or other value describing or obtained from the set of data samples.

In various embodiments, the variance from an aggregate value defining a neighbor noise data sample may be defined in numerous ways. For example, the variance may be a fixed numerical value, a multiple of the aggregate value, a percent change from the aggregate value, a number of standard deviations above the aggregate value, a percentile of the set of data samples contributing to the image point, or other metrics of variance from the aggregate value.

In some embodiments, neighbor noise contributors to an image point may be defined as samples with brightness values at least N times greater than the mean, median, mode, maximum, or other aggregate value of the set of contributors to the image point. In such embodiments, N may be at least about 1.0 up to about 2.0 or more.

In other embodiments, neighbor noise contributors may be defined as samples with brightness values more than N standard deviations greater than the mean value of contributors to the image point. In other embodiments, neighbor noise contributors may be defined as samples with brightness values greater than the maximum value of the set of contributors, or N times the maximum, or more than M % greater than the maximum. In other embodiments, neighbor noise contributors may be defined as samples with brightness values greater than the N times the mode, where the "mode" is defined as the most frequently occurring value in the set of data samples contributing to the image point. In some embodiments, the mode may be determined based on rounded values of the data samples (e.g., by rounding each value of the set to a predetermined number of digits and then determining the most frequent value).

In some embodiments, mathematical or other evaluations of the raw data samples collected by multiple transducer elements from a PMA system may be done before image beamforming in order to identify data samples to be adjusted. In some embodiments, such pre-beamforming evaluation may be used for other analyses such as object recognition or others.

Identifying Neighbor noise Data Samples by Edge Detection

A limitation of Ping Based Multiple Aperture Imaging (PMA) systems occurs when a hard tissue reflector or group of reflectors is located immediately adjacent to a soft tissue reflector or group of reflectors. In such instances, echo data samples contributing to a pixel or voxel that represents a hard tissue or highly echogenic reflector (i.e., a "bright" reflector image point) may be assigned a significantly stronger value on a grey scale than echo data samples representing a soft tissue or less-echogenic reflector (i.e., a relatively "dark" image point) immediately adjacent to the hard reflector. This noise may be created by both stronger and weaker echo signals being located on the same temporal ellipse relative to an ultrasound receiving element on a multiple aperture transducer array. Therefore, the ability to more accurately detect edges between hard (bright) reflectors and relatively softer (darker) reflectors may be used to enhance those edges in a final displayed image. Such "edge detection" techniques may also be useful in enabling automated analysis of raw echo data to produce actionable information even before producing an image.

FIG. 1A demonstrates a ping based multiple aperture probe 100 against a skin surface S, with arrays 12, 14, and 16. Subarrays or often individual elements within each array are indicated as points a, b, c, d, e, f, g, h and i. However, sub-arrays can be located across physical gaps between arrays and should not be considered limited to individual elements on an individual array. A ping transmission is represented by the wavefront 13 (dashed wavefront(s)) generated by a transmit aperture at 'a' on array 12 and is indicated by wavelets. Point A in the medium or tissue 20 is meant to represent a hard structure (e.g., calcium or hardened plaque from atherosclerosis, or other hard objects such as bone), which would immediately reflect or scatter the transmitted wavefront 13 in multiple directions represented here as reflected wavefront 15 (solid wavefront(s)). The reflected wavefront emanating from point A may provide a relatively bright signal to the receive elements in arrays 12, 14, and 16. The transmitted wavefront 13 may also continue on through the medium or tissue 20 to point B, which is meant to represent an anechoic structure (e.g., a blood vessel or other soft tissue) that would provide a relatively weaker reflected wavefront 17 back to the elements on arrays 12, 14, and 16.

Figure 1B:
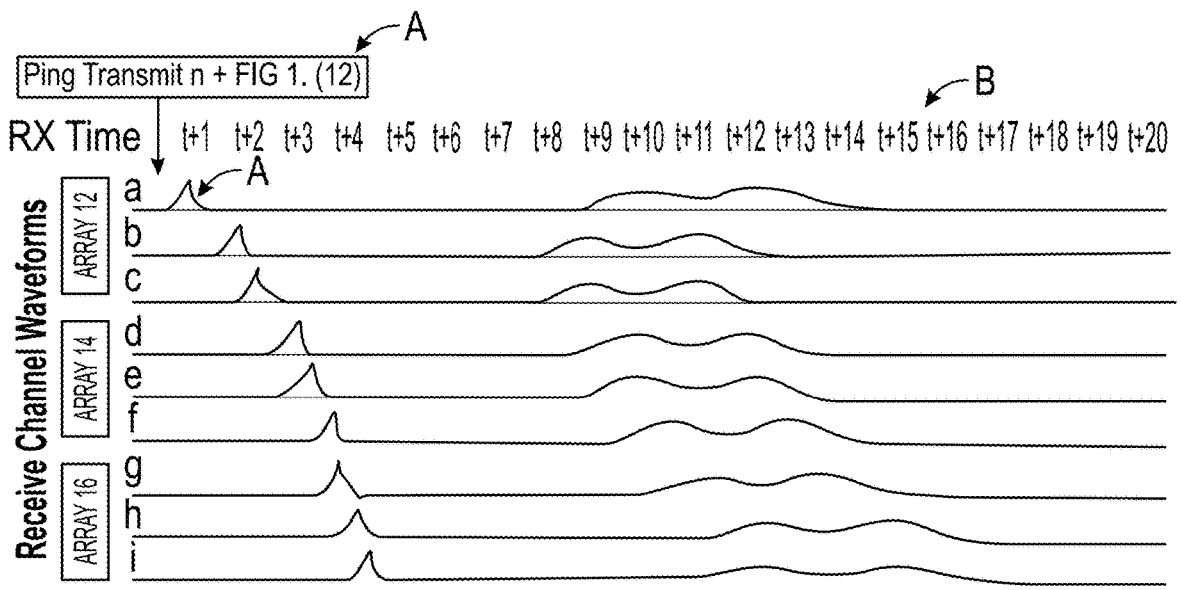
FIG. 1B are illustrations of received waveform coming from elements on each of the three transducers arrays.

FIG. 1B is an illustration of waveforms representing the amplitude and timing of wavefronts 13 and 17 respectively returning to receivers a, b, c, d, e, f, g, h and i on each of the three arrays 12, 14, and 16 of FIG. 1A. As shown in FIG. 1B, the amplitude of reflections from objects A and B can be seen. Note that the amplitude of object at B is stronger at the edges of the object and weakens inside the mostly anechoic object interior. The reflections are received at different times on the array based on the distance from each receive element to the object. For example, it can be seen that element a on array 12 is closer to object A, as the reflection is received at time t+1. In contrast, element I on array 16, which is furthest from object A, does not receive the reflection until time t+4. The same can be seen for object B, with elements b, c, and d being the closest and element i being the furthest from object B.

Figure 1C:
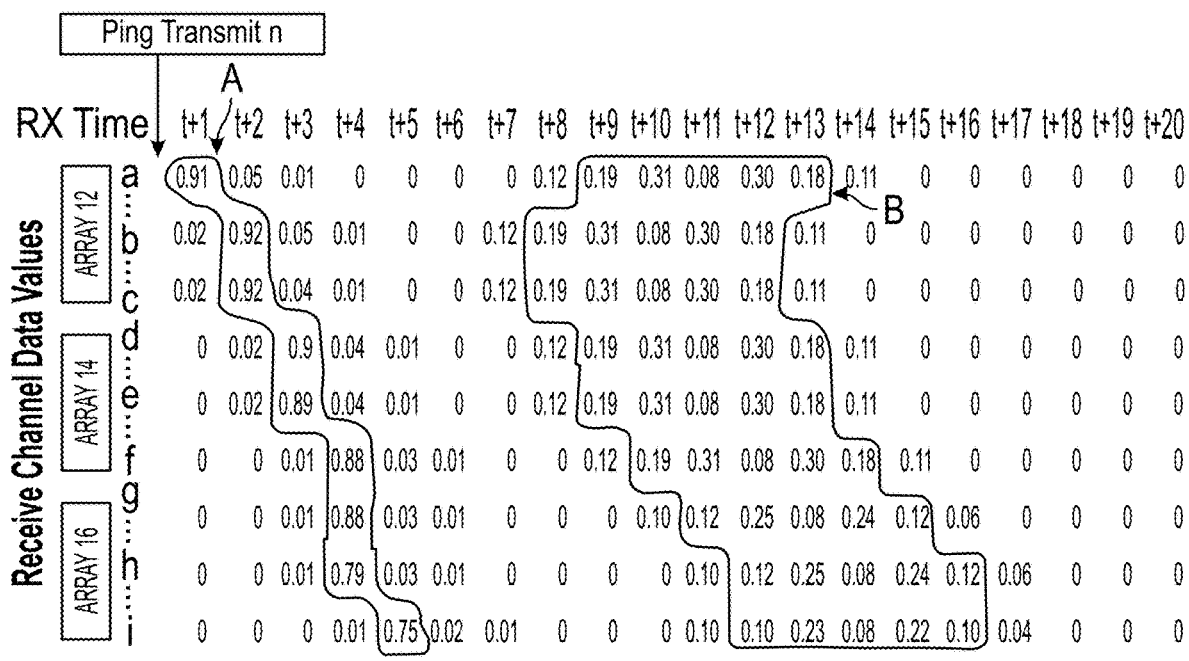
FIG. 1C represents digital data information by channel associated with each element of the three transducer arrays.

FIG. 1C is a table indicating digital data sample values associated with signal strength being stored from each receiver's data channel relative to a ping's transmission. The circumscribed data samples in FIG. 1C suggest that a strong reflector A is located near Array 12 element a, and the amplitude of that signal can be mapped through as it is received on elements across the probe. As shown, this data represents Point A in the medium 20; however, even without beamforming and even as reflector strength drops off the further the echo is being received from the origin or the reflector, it is still clear that this point can be mapped and tracked while still in the digital realm. In other words, the point A may be detected and distinguished by analysis of the data samples even without beamforming and displaying an image.

Further in FIG. 1C, as time progresses on Array 12 element a toward t+10 a small signal builds, then is followed by almost no signal at t+11, then a small signal again in t+12 followed by almost no signal. This data would represent Point B if an image were to be beamformed from it. However, that same pattern of small signals bracketing a weak signal appear in the channels going down through the probe data even though being received at slightly different times. The pattern appears to be closest to Array 12 elements b and c, then gets further away when moving onto Arrays 14 and 16.

Regardless of the individual ping transmission observed in FIGS. 1B and 1C, current Ping Based Multiple Aperture systems at this point compound the total data from a selectable sequences of pings (e.g. 13, 15 . . . n) and associated reflected data un-beamformed raw data from all receivers to create a single data set. This data set then is beamformed into a pixelated image. This compounded beamforming can subsequently enable the noise to be accrued from a strong target being adjacent to a weak target.

Mitigating Neighbor Noise Data Samples

Once identified, the impact of neighbor noise contributors on an image point may be mitigated in various ways. In some embodiments, data samples identified as containing bright high noise may be weighted by a pre-determined fractional adjustment factor. For example, the brightness of a neighbor noise data sample may be multiplied by an adjustment factor of between about 0.5 and 0.001 or smaller. Example adjustment factors may include 0.50, 0.45, 0.40, 0.35, 0.25, 0.20, 0.15, 0.10, 0.05, 0.04, 0.03, 0.02, 0.01, 0.005, 0.001, or smaller weights. In other embodiments, a neighbor noise data sample may be re-set to be equal to an aggregate value of its co-contributors. For example, a neighbor noise data sample may be re-set to be equal to a median, mean, mode, minimum, or other value obtained from analysis of the set of contributors that includes the identified neighbor noise sample. In other examples, a neighbor noise data sample may be re-set to equal to or less than a pre-determined number of standard deviations from a mean, median, mode or other aggregate value. In still other embodiments, a neighbor noise data sample may be re-set to a brightness value of zero or a pre-determined minimal value.

In some embodiments, a set of adjustment factors for an entire image or a region of an image may be referred to herein as a "mask" applied to the image or region. Such a mask may simply be an array of adjustment factors corresponding to image points and/or data samples used to form the image or image region.

Figure 2:
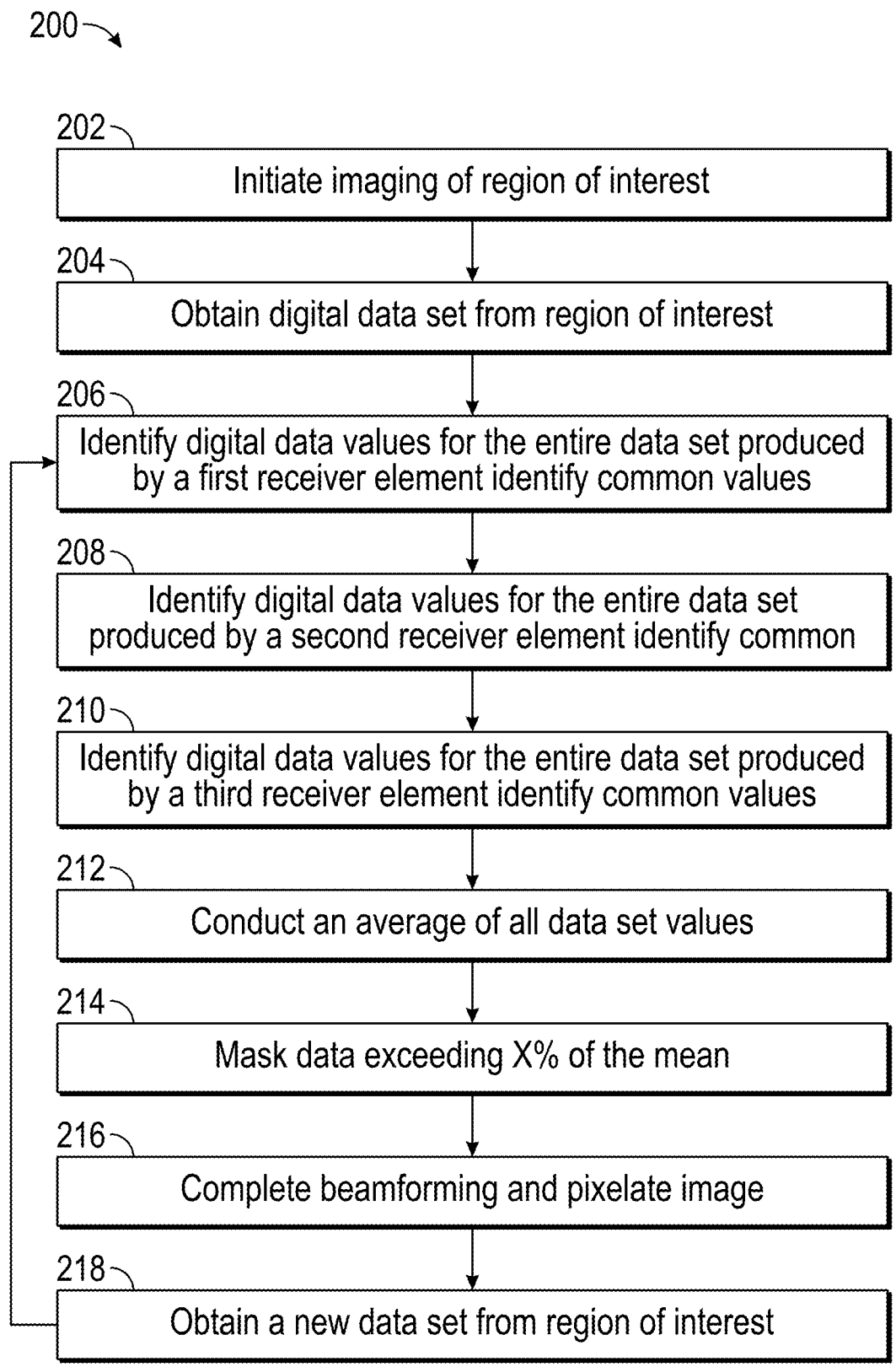
FIG. 2 is a diagram mapping the process of collecting raw data from a multiple aperture ping based system imaging an region of interest, compartmentalizing data from different elements receiving echo data from the same transmitted ping, identifying large differentials in data, masking out larger values and then beamforming the image.

In one embodiment, neighbor noise can be substantially reduced by use of a data masking technique such as the Process 200 illustrated in FIG. 2. Step 202 indicates that PMA systems are used in their standard data collection format by the user to image the region of interest. This can include transmitting one or more unfocused ultrasound pulses from the PMA system into a region of interest. In some embodiments, the region of interest can include one or more types of tissue including bones. While PMA systems may utilize beamforming in real time to present an image to the user, the PMA system may also collect data sets continuously. In fact, the image that is presented during the imaging session may simply be a subset of the data that is available to be beamformed into an image and may be purely selectable by the user either in real-time on the system or remotely via cloud operation. Step 204, therefore, highlights the fact that the PMA system is collecting a data set from the entire region of interest, not just the image that is being presented. This can include receiving echoes from tissue and converting the echoes to a digital channel data on one or more channels.

FIG. 2, step 206 then begins the process of analyzing the data in the region of interest. Data being collected after Analog to Digital conversion is stored into data strings for a first Receiver Element. This receiver element may be part of an array, or it may be an independent element used as an omni-directional receiver. It need not be used in conjunction with other elements to collect and compound data in real time. Step 208 therefore, highlights that a second receiver element is used to produce a second string of data coming off of the same ping utilized to provide receiver element data to the receiver in step 206. Similarly, echo data coming off of the same ping transmission for 206 and 208 is used by a third receiver element described in step 210.

A processor is then utilized in step 212 to conduct an average of all data set values for all data strings. In some implementations, the data string may be collected for an entire region of interest (i.e. large sample period). In other implementations, the data may be collected for only a specific pixel (i.e. specific sample period). The user may then select a control to mask data based on a percentage of the mean data for each string as described in step 214. The mask eliminates data, both high and low, that falls outside of the percentage of mean range. Conversely, the mask could be utilized to eliminate data inside the percentage of the mean range, and thus keep the "outliers." Step 216 utilizes the remaining data in the beamforming process to create pixelated images. In the case of 3D imaging, the same process can be utilized to create voxel images. Step 218 indicates that the process can be repeated. When imaging in real time, new data may be used to change or select a new mask value. When dealing with a stored or static data set, the adjustment mask values can be adjusted on the existing data set.

Figure 3:
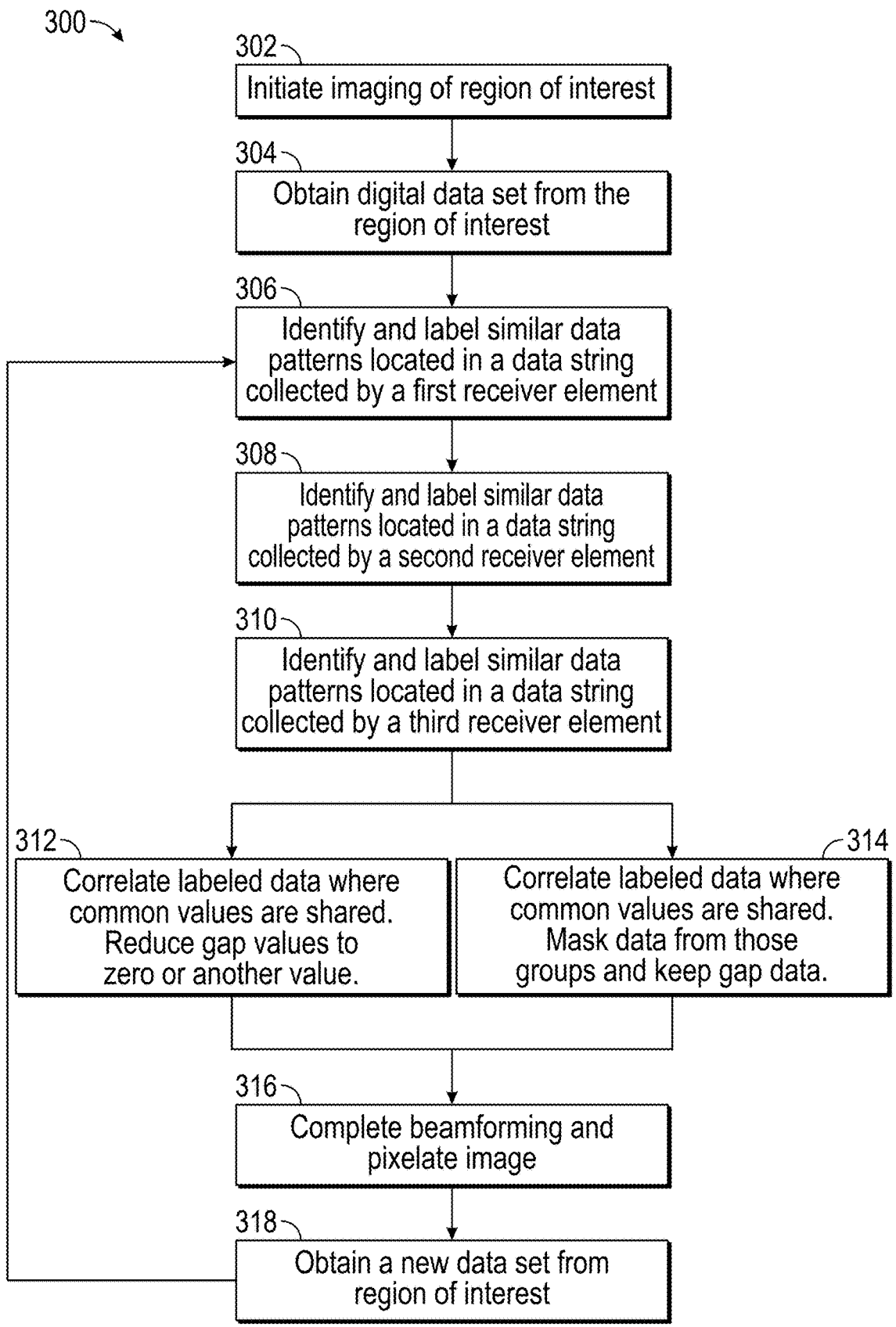
FIG. 3 is a diagram mapping the process of collecting raw data from a multiple aperture ping based system imaging an region of interest, compartmentalizing data from different elements receiving echo data from the same transmitted ping, averaging data values amongst the data strings, then masking data outside the selectable percentage from the mean, in data, and then beamforming the image.

In one embodiment, neighbor noise can be substantially reduced by grouping digital data as outlined on FIG. 3, Process 300. Step 302 indicates that PMA systems are used in their standard data collection format by the user to image the region of interest. Step 304, highlights the fact that the PMA system is collecting a data set from the entire region of interest, not just the image that is being presented. Step 306 uses artificial intelligence to group data of similar values on different data strings into known object locations. This is best illustrated in FIG. 1A and FIG. 1B. FIG. 1B represents a digital data string for elements a through i along different arrays 12, 14 and 16 over time periods t+1 through t+20. Although appearing at different times in different data strings, a correlation of the existence of a strong reflector (A) is noticeably present in each data string. The presence, when compared to surrounding reflectors, is differentiated even though weaker discernment is apparent as the echo reaches receiver elements that are further away from point A in FIG. 1A. Similarly, the appearance of moderate signal strength, then weaker signal, then stronger again in a saddle type shape can be discerned in the data strings presumably representing point B in FIG. 1A. Although the amplitude of this reflector is weaker and dynamic, there is a definite correlation that can be made within receiver data strings even though the time of receipt differs.

Step 306 of FIG. 3 uses data correlations or artificial intelligence to designate similar data patterns as groups or fiducials that will ultimately be displayed together in an image. While in the data string state, they become named or numbered groupings or fiducials. Steps 308 and 310 show this same process being conducted for elements for a second and third receiver elements. Step 312 empowers the system to either automatically or manually reduce the gaps between labeled or fiducial groupings to zero. Conversely, Step 314 empowers the system to mask out labeled or fiducial groups and keep only the data retained from the gaps in between fiducial groups. A control in the system can be configured to alternate between methods 312 and 314 automatically or enable the user to select between Step 312 or Step 314.

Step 316 utilizes the now filtered data to be beamformed into an image. Step 318 begins the process of obtaining new data. Image data can also be stored after step 316, saved in memory, and then added to data using the other filter path.

Any of the foregoing embodiments may be used in combination with a multiple aperture imaging probe of any desired construction. Examples of multiple aperture ultrasound imaging probes are provided in Applicant's prior patent applications referenced herein.

Embodiments of the systems and methods described above may also be beneficially applied to multiple aperture ultrasound imaging systems utilizing focused phased array transmit pulses rather than point source transmit pulses (pings). Similarly, embodiments of the systems and methods described above may also be beneficially applied to single-aperture imaging systems using multiple sub-apertures for ping transmission. In still further embodiments, the methods described above may also be applied to conventional ultrasound systems using phased array-transmissions from a single-aperture probe.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Various modifications to the above embodiments will be readily apparent to those skilled in the art, and the generic principles defined herein may be applied to other embodiments without departing from the spirit or scope of the invention. Thus, it is intended that the scope of the present invention herein disclosed should not be limited by the particular disclosed embodiments described above, but should be determined only by a fair reading of the claims that follow.

In particular, materials and manufacturing techniques may be employed as within the level of those with skill in the relevant art. Furthermore, reference to a singular item, includes the possibility that there are plural of the same items present. More specifically, as used herein and in the appended claims, the singular forms "a," "and," "said," and "the" include plural referents unless the context clearly dictates otherwise. As used herein, unless explicitly stated otherwise, the term "or" is inclusive of all presented alternatives, and means essentially the same as the commonly used phrase "and/or." It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

What is claimed is:

1. A method of reducing noise in ultrasound imaging, comprising the steps of:
    transmitting a first unfocused ultrasound pulse with a multiple-aperture ultrasound array into a region of interest having one or more types of tissue including bones;
    receiving echoes from the region of interest with one or more receive elements of the multiple-aperture ultrasound array;
    forming a digital data set for a plurality of pixels in the region of interest for each of the one or more receive elements;
    conducting an average of all the digital data sets;
    applying a control to mask data values from the digital data sets to include or exclude data based on a user-selected percentage of the average;
    producing a masked data set output; and
    beamforming the masked data set output to produce one or more ultrasound images.

2. The method of claim 1, wherein the control mask eliminates data that falls outside of the user-selected percentage of the average.

3. The method of claim 1 wherein beamforming the masked data set output produces one or more 3D ultrasound images.

4. The method of claim 1, wherein the beamforming is performed in real time, and wherein new data may be used to change or select a new masked data set output.

5. The method of claim 1, further comprising adjusting the masked data values.

6. The method of claim 1, further comprising transmitting a second unfocused ultrasound pulse into the region of interest and receiving echoes from the region of interest with one or more receive elements.

7. The method of claim 1, wherein beamforming the masked data set output produces an image of all or a subset of the region of interest.

8. The method of claim 1, wherein the echoes may be received from one or more elements of the same array.

9. The method of claim 6, wherein the first unfocused ultrasound pulse is transmitted with more ultrasound transducers than the second unfocused ultrasound pulse.

10. The method of claim 6, wherein the second unfocused ultrasound pulse is transmitted with more ultrasound transducers than the first unfocused ultrasound pulse.

11. A method of reducing noise in ultrasound pulse imaging, comprising the steps of:
    transmitting a first unfocused ultrasound pulse with a multiple-aperture ultrasound array into a region of interesting having one or more types of tissues;
    receiving echoes from the region of interest with one or more receive elements of the multiple-aperture ultrasound array;
    forming a first digital data set for echoes received by a first receiver element;
    forming a second digital data set for echoes received by a second receiver element;
    identifying groups of similar data where common values are shared between the first and second digital data sets;
    masking data where common values are shared;
    reducing gap values in the first and second digital data sets to zero or another values;
    producing a masked data set output; and
    beamforming the masked data set output to produce one or more ultrasound images.

12. A method of reducing noise in ultrasound imaging, comprising the steps of:
    transmitting a first unfocused ultrasound pulse with a multiple-aperture ultrasound array into a region of interest having one or more types of tissue including bones;
    receiving echoes from the region of interest with one or more receive elements of the multiple-aperture ultrasound array;
    forming a first digital data set for echoes received by a first receiver element;
    forming a second digital data set for echoes received by a second receiver element;
    identifying groups of similar data in the first and second digital data sets;
    correlating the similar data where common values are shared between the first and second digital data sets;
    masking data where common values are shared;
    keeping only data retained from gaps between the first and second digital data sets;
    producing a masked data set output; and
    beamforming the masked data set output to produce one or more ultrasound images.

* * * * *